United States Patent
Sai et al.

(10) Patent No.: US 7,304,672 B2
(45) Date of Patent: Dec. 4, 2007

(54) CONTOUR CORRECTING VIDEO SIGNAL PROCESSING APPARATUS

(75) Inventors: Hirotomo Sai, Yokohama (JP); Akihito Nishizawa, Yokosuka (JP); Junji Kamimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 790 days.

(21) Appl. No.: 10/743,816

(22) Filed: Dec. 24, 2003

(65) Prior Publication Data

US 2004/0207758 A1 Oct. 21, 2004

(30) Foreign Application Priority Data

Dec. 25, 2002 (JP) ............................. 2002-374819
Dec. 25, 2002 (JP) ............................. 2002-374836

(51) Int. Cl.
*H04N 5/208* (2006.01)
*H04N 5/21* (2006.01)

(52) U.S. Cl. ................... 348/252; 348/627; 382/266

(58) Field of Classification Search ............... 348/241, 348/627–629, 252; 382/266–269; 345/611; 358/3.27
See application file for complete search history.

(56) References Cited

U.S. PATENT DOCUMENTS 4,733,300 A * 3/1988 Sugiyama et al. ........... 348/448
5,157,481 A * 10/1992 Kashimura et al. .......... 348/263
5,838,371 A 11/1998 Hirose et al.
5,880,767 A * 3/1999 Liu ............................. 347/251
5,920,357 A * 7/1999 Ohara .......................... 348/625
6,677,994 B1 * 1/2004 Kobayashi ................... 348/252
2002/0047908 A1* 4/2002 Mise et al. .................. 348/222
2002/0067862 A1* 6/2002 Kim ............................ 382/266

FOREIGN PATENT DOCUMENTS

| JP | 58-38074 | | 3/1983 |
| JP | 3-29578 | | 2/1991 |
| JP | 5-316393 | | 11/1993 |
| JP | 6-261238 | | 9/1994 |
| JP | 07184169 A | * | 7/1995 |
| JP | 09083958 A | * | 3/1997 |
| JP | 2001-53985 | | 2/2001 |
| JP | 2001-053985 | | 2/2001 |
| JP | 2001-157217 | | 6/2001 |

OTHER PUBLICATIONS

H. Kitsuka et al., "7.3 Resolution Conversion Using a Digital Filter", CQ Publishing Company, Aug. 1, 2003, pp. 168-174.

* cited by examiner

Primary Examiner—Victor R. Kostak
(74) Attorney, Agent, or Firm—McDermott Will & Emery LLP

(57) ABSTRACT

The contour correction processing of a still picture that can suppress the generation of a black edge due to an undershoot in a contour portion is enabled while increasing a feeling for resolution. Moreover, an interpolation device that improves the sharpness of a digital picture is provided without increasing a circuit scale.

17 Claims, 12 Drawing Sheets

CONTOUR CORRECTING VIDEO SIGNAL PROCESSING APPARATUS

BACKGROUND OF THE INVENTION

1. Field of the Invention

The present invention relates to an apparatus and a method for video signal processing, and a camera device and a method therefor, using the apparatus and method for video signal processing. In particular, the invention relates to the apparatus and method for video signal processing for correcting a contour of a picture, and the camera device and method therefor, using the apparatus and method for video signal processing.

2. Description of Related Art

There is known a method for increasing the resolution of a picture, e.g., disclosed in JP-A Nos. 38074/1983 or 29578/1991. The method has, with regard to a camera device, a step of generating a contour correction signal consisting of a preshoot and an overshoot in a horizontal or vertical direction from a video signal for correcting the deterioration of a frequency characteristic through an aperture of an image pickup device, and a step of adding this contour correction signal to the original video signal thereby to increase the resolution of a picture.

FIG. 2 is a block diagram showing one conventional example of a contour correction circuit used in a video signal processing apparatus. Numeral 1 is a contour correction circuit, 1a is a contour correction signal generation unit, 1b is a gain adjustment unit, 1c is an addition unit, 1d is an input terminal, and 1e is an output terminal.

FIG. 3 is a waveform chart showing a signal of each unit in FIG. 2, and the signal that corresponds to FIG. 2 is marked with the same symbol.

In FIGS. 2 and 3, a digital video signal a input from the input terminal 1d is supplied to the addition unit 1c and the contour correction signal generation unit 1a in the contour correction circuit 1. At this point, FIG. 3(a) shows a portion (a leading or trailing edge portion) in which the contour of this digital video signal a exists.

In the contour correction signal generation unit 1a, a high frequency component of this digital video signal a is sampled. A contour correction signal b consisting of the preshoot and overshoot shown in FIG. 3(b) that synchronize with a contour portion of the digital video signal a is generated from this high frequency component. This contour correction signal b is supplied to the addition unit 1c after a gain has been adjusted by the gain adjustment unit 1b, and is added to the original digital video signal a input from the input terminal 1d. Accordingly, the output terminal 1e obtains a digital video signal c in which the contour portion was enhanced and corrected by undershooting on the low luminance level side and overshooting on the high luminance level side in the contour portion of the original digital video signal a.

According to such contour correction processing, in a conventional digital video signal processing apparatus that primarily handles a moving picture, there was an effect indicating that a feeling for the resolution of a picture increases and image quality improves.

Incidentally, the object of contour correction is to increase an inclination of an edge, but it is not ideal that an undershoot and an overshoot are generated. Accordingly, an art of reducing these undershoot and overshoot is proposed (refer to JP-A No. 316393/1993).

This art indicates that when a contour correction signal including an undershoot and an overshoot is generated in the same manner as described above, the time width of these undershoot and overshoot is shortened by passing this signal through a switching means, and, subsequently, the contour correction signal processed in this manner is added to the original video signal.

Moreover, the invention relates to an interpolation device and method for sample interpolation used in the enlargement of a digital picture, and, more particularly, to a camera device and its imaging method.

An interval (cycle) of a sample (pixel) is also enlarged to sample a part of a digital picture, and to enlarge and display this part. Accordingly, inter-sample interpolation is performed to match the original sample cycle. As such an interpolation method of a conventional image, a linear interpolation method is cited (for example, refer to "More Plain Digital Video Processing" 9th Edition, Published by Hitoshi Kitsuka, CQ Publishing Company, on Aug. 1, 2003, on pp. 168 to 174).

The conventional interpolation method will be described using FIG. 12.

Now, a picture is cut out in a certain direction (for example, a horizontal scanning direction), and a picture $P_1$ having an edge between samples A and B is targeted, as shown in FIG. 12(a), regarding a unit in which the vertical axis indicates a signal level or the horizontal axis indicates a sample cycle t as distance.

When an area including this edge of a part of this type of picture $P_1$ is sampled and this area is enlarged into four times, this edge portion becomes a picture $P_2$ shown in FIG. 12(b). At this point, this picture $P_2$ has the sample cycle T=4t and turns into a very coarse picture. At this point, the samples A, B are the samples A, B in FIG. 12(a). The signal level of the sample B changes greatly for the sample A because of the aforementioned edge.

Further, this type of picture $P_2$ corresponds to a picture as well in which a sample was sampled in the cycle T.

A sample is interpolated to improve the image quality of this type of coarse picture $P_2$. Linear interpolation is performed hitherto as this type of interpolation method, but FIG. 12(c) shows a picture $P_3$ in which this type of linear interpolation was performed. This linear interpolation method connects adjacent samples by a straight line and interpolates the sample of the signal level on this straight line in a cycle t.

In this type of linear interpolation method, a sample at adjacent two points is filtered. Moreover, according to a filter using information about an unlimited sample on a time axis that extends endlessly, as shown in FIG. 12(d), the sample can be interpolated at a point on a sine wave of the, cycle 2T connecting the samples A and B based on a sampling theorem. In reality, interpolation data approximate to the interpolation shown in FIG. 12(d) can be obtained by using a filter having a characteristic approximate to an ideal using the limited number of samples. As the method in which the filter of the characteristic approximate to the ideal using such limited number of samples was used, there is a bicubic method (for example, refer to JP-A No. 2001-157217).

SUMMARY OF THE INVENTION

Incidentally, in recent years, a video signal processing apparatus that handles a still picture is diffusing. For example, a digital still camera that records a photographed picture in a recording medium such as a memory, a printer connected to a personal computer, a scanner main unit or driver software or video processing software for the personal computer.

When a video signal processing apparatus that handles a still picture performs the conventional contour correction processing described in FIGS. 2 and 3, however, in particular, an edge portion having a big difference in the luminance level of the still picture is stained with a black edge on the low luminance level side because of the undershoot shown in FIG. 3 and this black edge is highlighted exceedingly.

On the other hand, as described in Patent Document 3, an art in which the time width of an undershoot and an overshoot in a contour correction signal to be generated at contour correction is reduced and these effects are reduced is proposed. In this type of art, however, even if the time width of the undershoot and overshoot is reduced, most of the signal levels of these undershoot and overshoot remain. Accordingly, a black edge generated by the undershoot merely narrows its width, but the black edge is still highlighted.

Moreover, even the art described in any of the aforementioned patent documents obtains only the contour correction effect caused by the contour correction signal to be generated. Particularly, in case of a still picture, a further improvement of the contour correction is desirable.

A first object of the invention is to provide a video signal processing apparatus and method that enables contour correction processing in which such a problem is solved and the generation of a black edge can be suppressed effectively in a contour portion making the contour portion shaper for a still picture, and a camera device and its imaging method.

Incidentally, there is a problem indicating that a taste of the blur of an edge is big in the linear interpolation method shown in FIG. 12.

Moreover, a picture in which the original sample cycle sampled the picture of t in the cycle T (=4 t) is created. Even if this picture is interpolated using the aforementioned filter of an ideal characteristic, a taste of the blur in this picture remains in comparison with the picture before sampling. Accordingly, as described above, even if a part of the picture is sampled and enlarged, and this part is interpolated using the filter of the characteristic ideal for this enlarged picture, a sharp edge will not be obtained satisfactorily.

Moreover, there is also a problem indicating that a circuit scale increases because calculation becomes complicated and a multiplication circuit increases in the interpolation method using the filter of the characteristic approximate to an ideal such as a bicubic method.

A second object of the invention is to provide an interpolation device that solves such a problem and can effectively obtain a feeling for the sharpness of an edge portion without increasing a circuit scale and an interpolation method and method using this and a camera device and its imaging method.

To attain the first object, one aspect of the invention resides in a video signal processing apparatus having multiple contour correction means that correct a digital video signal to be input for a contour and a selection means that selects any of the multiple contour correction means, wherein one predetermined contour correction means among the multiple contour correction means includes a contour portion detection means that detects a contour portion of the input digital video signal, and a contour portion correction means that corrects the contour portion of the digital video signal corrected for the contour by a contour correction means other than the predetermined contour correction means. In this case, the selection means selects a digital video signal output from an addition means when a contour portion period was detected by the contour portion detection means.

In another aspect of the invention, a contour correction means other than the predetermined contour correction means corrects a contour by generating an undershoot and an overshoot in the contour unit of the input digital video signal.

In another aspect of the invention, a contour portion correction means has a contour correction signal generation means that generates a contour correction signal in accordance with the contour portion of the input digital video signal and a mixing means that mixes this contour correction signal and a digital video signal whose contour was corrected by a contour correction means other than the predetermined contour correction means at a predetermined ratio, and suppresses an undershoot of the contour-corrected digital video signal.

In another aspect of the invention, a contour portion detection means judges whether the detected contour portion is a rising contour portion or a falling contour portion, and delays the detection timing of a contour portion period when the detected contour portion is the falling contour portion. The contour correction signal generation means generates the generated contour portion correction signal in accordance with the contour portion period the contour portion detection means detected.

In another aspect of the invention, a contour portion detection means has a first means that assumes a flat portion of a picture to exist when a fluctuation of a digital video signal is within the range of a preset threshold and a second means that assumes a contour portion of the digital video signal to exist between two flat portions when the slope between the two flat portions detected by the first means always ascends or descends and the absolute value of the difference in a signal level on the slope is higher than the preset threshold.

In another aspect of the invention, a contour portion detection means has a first means that assumes a picture to be a flat portion when a fluctuation of a digital video signal is within the range of a preset threshold, a second means that assumes a changing point at which a slope on which the fluctuation of the digital video signal subsequently ascends or descends moves to the slope on which it descends or ascends to be the crest of a peak or the root of a valley, and a third means that assumes the contour portion of the digital video signal to exist between these flat portion and changing point when the absolute value of the difference in the signal level between the flat portion detected by the first means and the changing point detected by the second means is higher than the preset threshold.

In another aspect of the invention, a contour portion detection means has a first means that assumes a first changing point at which a slope on which a fluctuation of a digital video signal subsequently ascends or descends moves to the slope on which it descends or ascends to be the crest of a peak or the root of a valley and assumes a second changing point at which the slope on which it sequentially descends or ascends from this first changing point, and then ascends or descends to be the root of the valley or the crest of the peak; and a third means that assumes the contour portion of the digital video signal to exist between the first and second changing points when the absolute value of the difference in the signal level between the first and second changing points detected by the first means is higher than the preset threshold.

To attain the aforementioned object, another aspect of the invention resides in a camera device having an imaging means that photographs an object and outputs an electric signal, a signal processing means that processes the electric signal output from the imaging means and generates a first digital video signal, and a video signal processing means that corrects the contour of this first digital video signal. In this case, the camera device uses any one of the aforementioned video signal processing apparatuses as the video signal processing means.

To attain the aforementioned object, another aspect of the invention resides in a video signal processing method that comprises a step of generating a first digital video signal in which the input digital video signal was enhanced and corrected for a contour and a second digital video signal that suppresses an undershoot in a contour portion in which this first video signal was enhanced, and, in a contour portion period; a step of selecting the second digital video signal; and, in a period other than the contour portion period, a step of selecting and outputting the first digital signal.

To attain the aforementioned object, another aspect of the invention resides in an imaging method that comprises a step of obtaining a digital video signal by processing a video signal obtained from an imaging means, and a step of correcting the digital video signal for a contour. The contour correction processing of the digital video signal is performed using the aforementioned video signal processing method.

To attain the second object, one aspect of the invention resides in an interpolation method in which adaptively switching the interpolation method permits of obtaining a feeling for the sharpness of an edge portion.

Another aspect of the invention resides in an interpolation device having multiple interpolation means that interpolate a digital video signal to be input and a selection means that selects any of the multiple interpolation means, wherein the one predetermined interpolation means among the multiple interpolation means comprises an edge detection means that detects an edge of the digital video signal and an edge enhancement means that enhances the edge. In this case, the selection means selects an interpolation signal in which an edge was enhanced by the edge enhancement means when the edge was detected by the edge detection means.

Incidentally, an edge generation means generates an edge signal represented at frequency exceeding one half of the sampling frequency of the digital video signal.

In another aspect of the invention, an edge detection means has a first means that assumes a flat portion to exist when a fluctuation of a digital video signal is within the range of a preset threshold and a second means that assumes an edge of the digital video signal to exist between two flat portions when the slope between these two flat portions detected by the first means always ascends or descends and the absolute value of the difference in a signal level on the slope is higher than the preset threshold.

In another aspect of the invention, an edge detection means has a first means that assumes a picture to be flat when a fluctuation of a digital video signal is within the range of a preset threshold, a second means that assumes a changing point at which a slope on which the fluctuation of the digital video signal subsequently ascends or descends moves to the slope on which it descends or ascends to be the crest of a peak or the root of a valley, and a third means that assumes an edge of the digital video signal to exist between these flat portion and changing point when the absolute value of the difference in the signal level between the flat portion detected by the first means and the changing point detected by the second means is higher than the preset threshold.

In another aspect of the invention, an edge detection means has a first means that assumes a first changing point at which a slope on which a fluctuation of a digital video signal subsequently ascends or descends moves to the slope on which it descends or ascends to be the crest of a peak or the root of a valley and a second changing point at which the slope on which it sequentially descends or ascends from this first changing point, and then ascends or descends to be the root of the valley or the crest of the peak and a third means that assumes an edge of the digital video signal to exist between the first and second changing points when the absolute value of the difference in the signal level between the first and second changing points detected by the first means is higher than the preset threshold.

Another aspect of the invention resides in a camera device having an imaging means that photographs an object and outputs an electric signal, a signal processing means that processes the electric signal output from the imaging means and generates a first digital video signal, a means that generates a second digital video signal of a long sample cycle from the first digital video signal, and an interpolation means that interpolates the sample in the second digital video signal. In this case, the camera device uses any of the aforementioned interpolation devices as the interpolation means.

Another aspect of the invention resides in an interpolation method that interpolates an input digital video signal by multiple interpolation means and selects and outputs any of the interpolated multiple digital video signals. The interpolation means among the multiple interpolation means detects an edge of the digital video signal, enhances the edge, and selects the digital video signal of the enhanced edge in the detected edge period.

Another aspect of the invention resides in a method that is obtained by the photographing of a camera device and generates a second digital video signal of a long sample cycle from a first digital video signal in which a signal was processed and interpolates the sample of the second digital video signal. In this case, the aforementioned interpolation method is used for interpolating the sample of the second digital video signal.

BRIEF DESCRIPTION OF THE DRAWINGS

These and other features, objects and advantages of the invention will become more apparent from the following description when taken in conjunction with the accompanying drawings wherein.

DETAILED DESCRIPTION OF PREFERRED EMBODIMENTS

Embodiments of the invention are described below with reference to the drawings.

Figure 1:
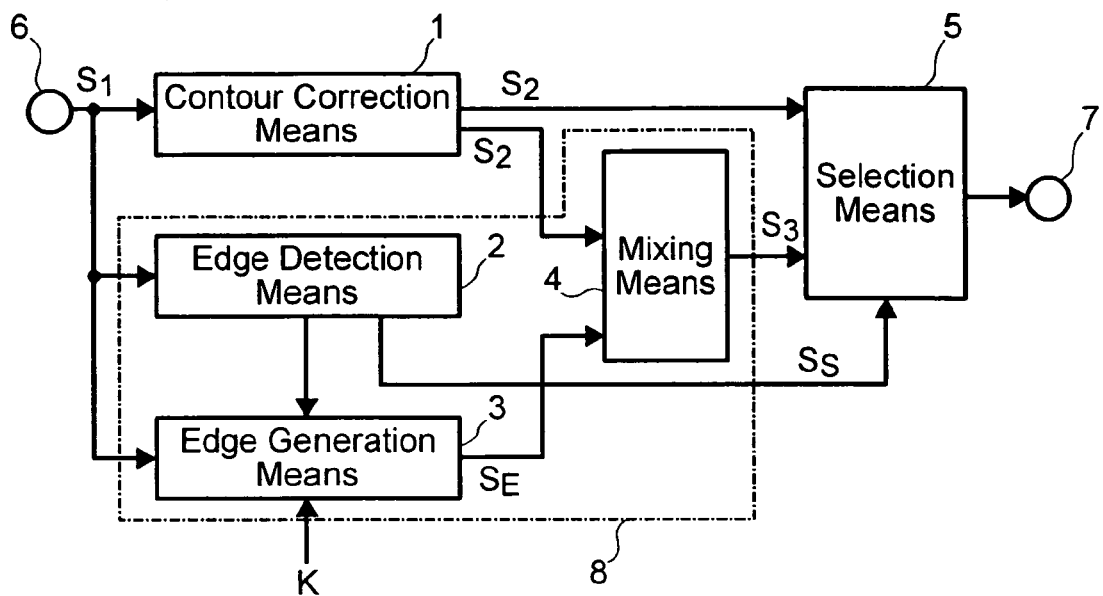
FIG. 1 is a block diagram showing the configuration of one embodiment of a video signal processing apparatus and a method according to the invention.

FIG. 1 is a block diagram showing one embodiment of a video signal processing apparatus and method according to the invention. Numeral 1 is a contour correction means, 2 is an edge (contour portion) detection means, 3 is an edge (contour correction signal) generation means, 4 is a mixing means, 5 is a selection means, 6 is an input terminal, 7 is an output terminal, and 8 is a contour correction means.

Figure 2:
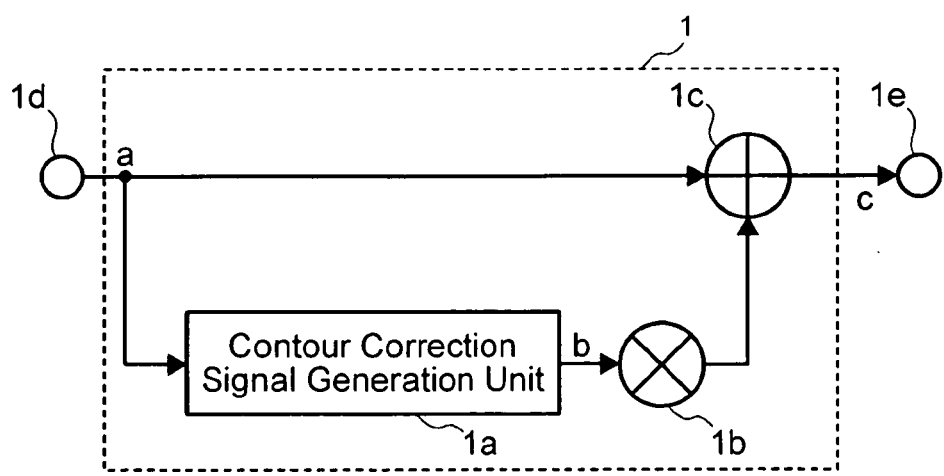
FIG. 2 is a block diagram showing one specific example of a contour correction means in FIG. 1.
Figure 3:
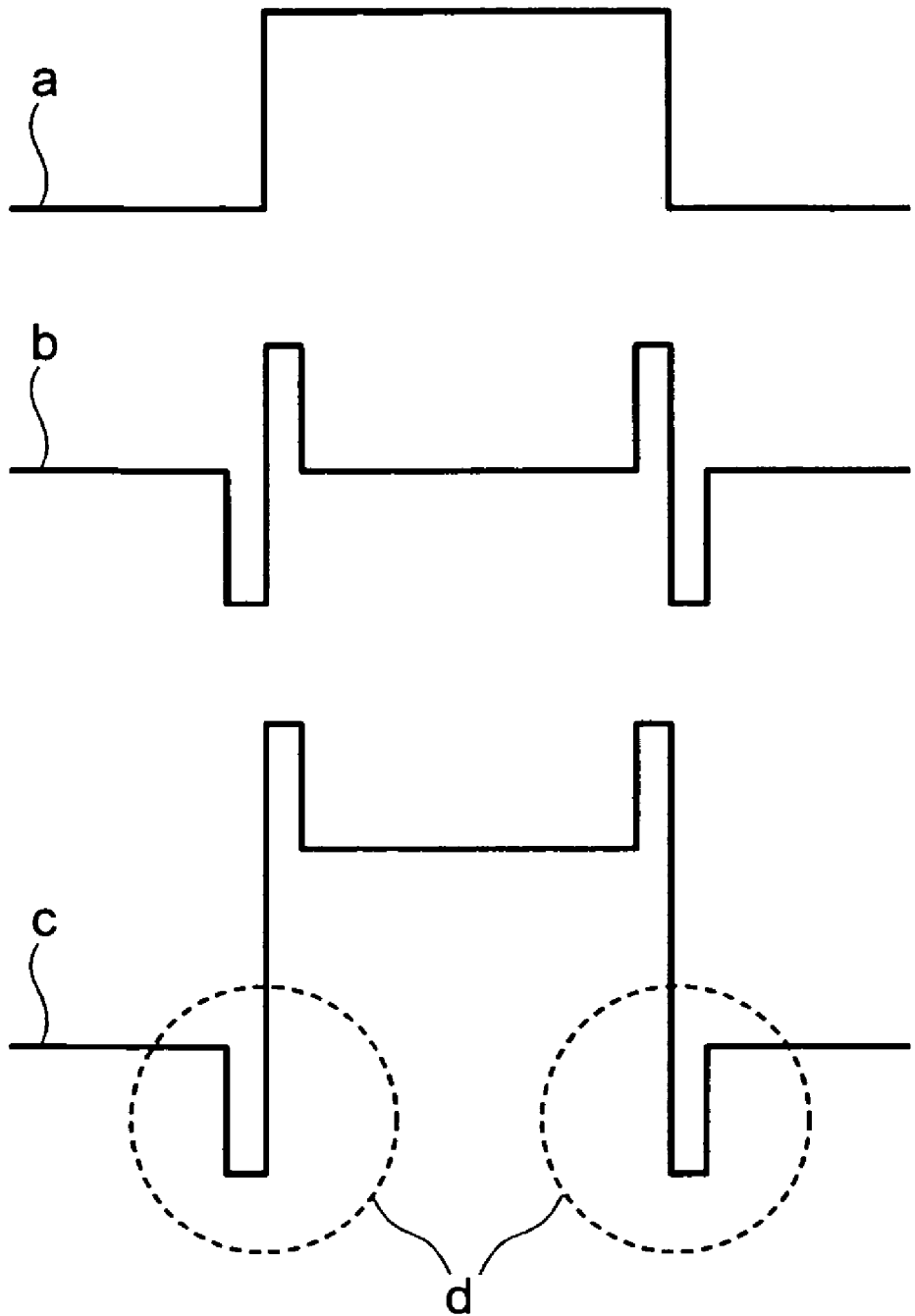
FIG. 3 is a waveform chart showing a signal of each portion in the specific example shown in FIG. 2.

In FIG. 1, a digital video signal $S_1$ input from the input terminal 6 is supplied to the contour correction means 1, 8. The contour correction means 1 has the same configuration as the conventional digital video signal processing apparatus shown in FIG. 2, and outputs a digital video signal $S_2$ in which a contour was corrected in the same manner as the digital video signal c shown in FIG. 3 by performing the same operation. This digital video signal $S_2$ is supplied to the selection means 5 and the mixing means 4.

On the other hand, the contour correction means 8 consists of the edge detection means 2, the edge generation means 3, and the mixing means 4. The digital video signal $S_1$ from the input terminal 6 is supplied to the edge detection means 2 and the edge generation means 3.

When the edge detection means 2 detects an edge (contour portion) of the input digital video signal $S_1$ by the method described later, the edge generation means 3 generates an edge signal $S_E$ using the digital video signal $S_2$ and an edge coefficient K supplied from an interpolation control means that is not illustrated, based on the detection result. This edge signal $S_E$ is supplied to the mixing means 4, and mixed with the digital video signal $S_2$ output from the contour correction means 1. Furthermore, this edge signal $S_E$ is mixed with the digital video signal $S_2$ in this manner. Accordingly, as described later, this signal is a contour correction signal for suppressing an undershoot in the contour portion generated by the correction processing of the contour correction means 1, and is represented as an edge signal below. The edge generation means 3 and the mixing means 4 form an edge correction means, in this manner, that suppresses the undershoot generated in the digital video signal $S_2$ that was interpolated from the contour correction means 1.

A digital video signal $S_3$ with which the edge signal $S_E$ output from this mixing means 4 was mixed is supplied to the selection means 5. This selection means 5 is controlled using a selection control signal $S_s$ for this edge period generated when the edge detection means 2 detected the edge of the digital video signal $S_1$, and selects, in an edge period, the output digital video signal $S_3$ of the mixing means 4, and, in a period other than the edge period, the output digital video signal $S_2$ of the contour correction means 1. Consequently, the output digital video signal $S_2$ of the contour correction means 1 is interpolated using the output digital video signal $S_3$ of the mixing means 4 and obtained in the output terminal 7 in the edge period.

Subsequently, the operation of the edge detection means 2 is described with reference to FIGS. 4 to 7.

Figure 4:
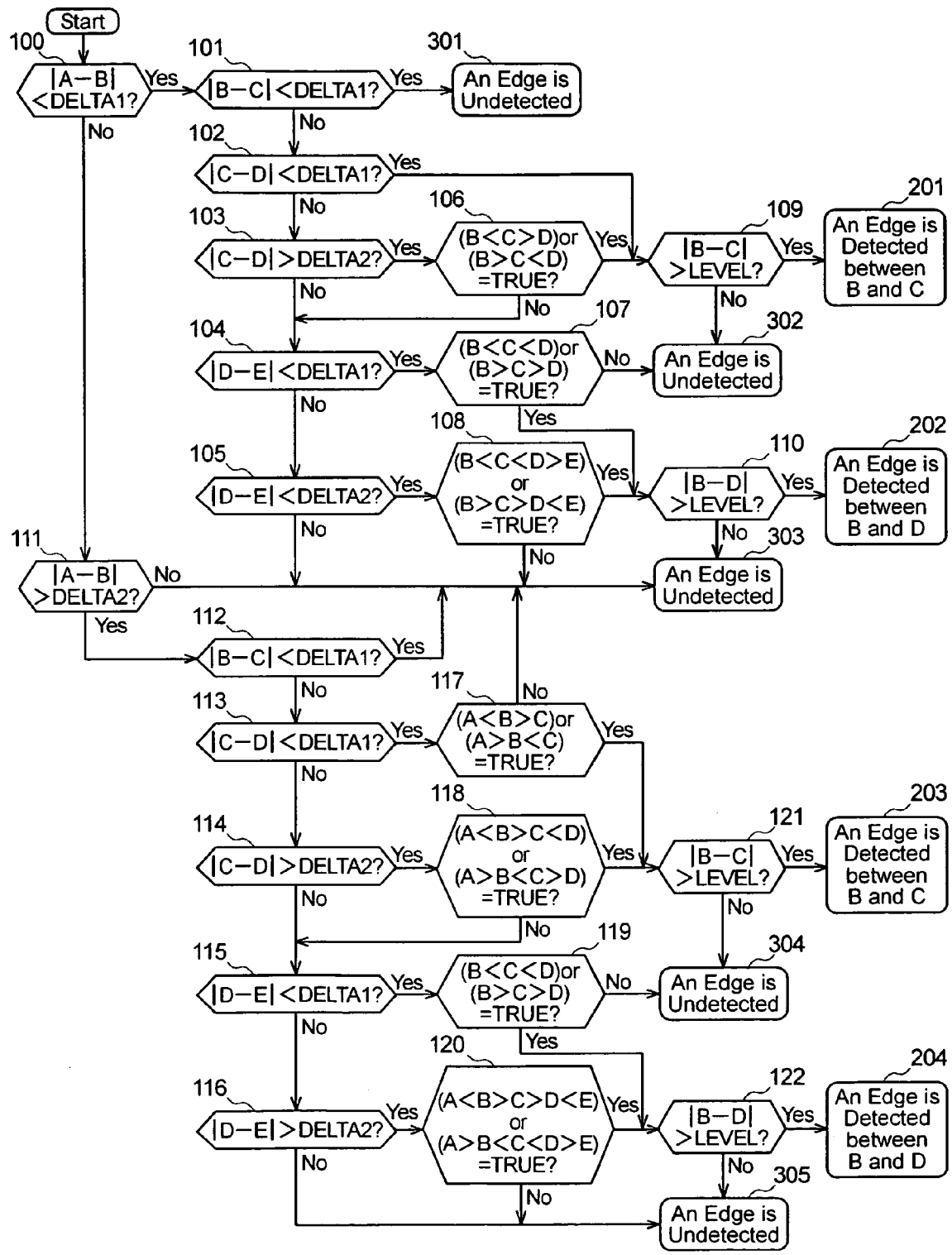
FIG. 4 is a flowchart showing the one specific example of an operation of an edge detection means in FIG. 1.

FIG. 4 is a flowchart showing one specific example of the edge detection operation of the edge detection means 2. This edge is judged regarding multiple sample periods (hereinafter referred to as a judgment sample period) using three thresholds DELTA 1, DELTA 2, and LEVEL, and their relations are DELTA 1<DELTA 2 and DELTA 1<LEVEL. This judgment sample period is set in such a degree that an edge of a striped pattern repeated in the minimum cycle on a picture can be judged. Incidentally, the threshold DELTA 1 is used for judging a flat portion (hereinafter referred to as a flat portion merely) of the picture. The threshold DELTA 2 is used for judging the crest of a peak of the picture or the root of a valley of the picture (hereinafter referred to as the crest of a peak or the root of a valley merely). The threshold LEVEL is used for judging an edge.

The edge detection operation of the edge detection means 2 is described below citing one specific example of an image pattern.

(1) As a first edge criterion of the edge judgment of the edge detection means 2, two flat portions that differ in a signal level are detected in the aforementioned judgment sample period. When no flat portion can be found between these flat portions, an edge is assumed to exist between these flat portions.

Figure 5:
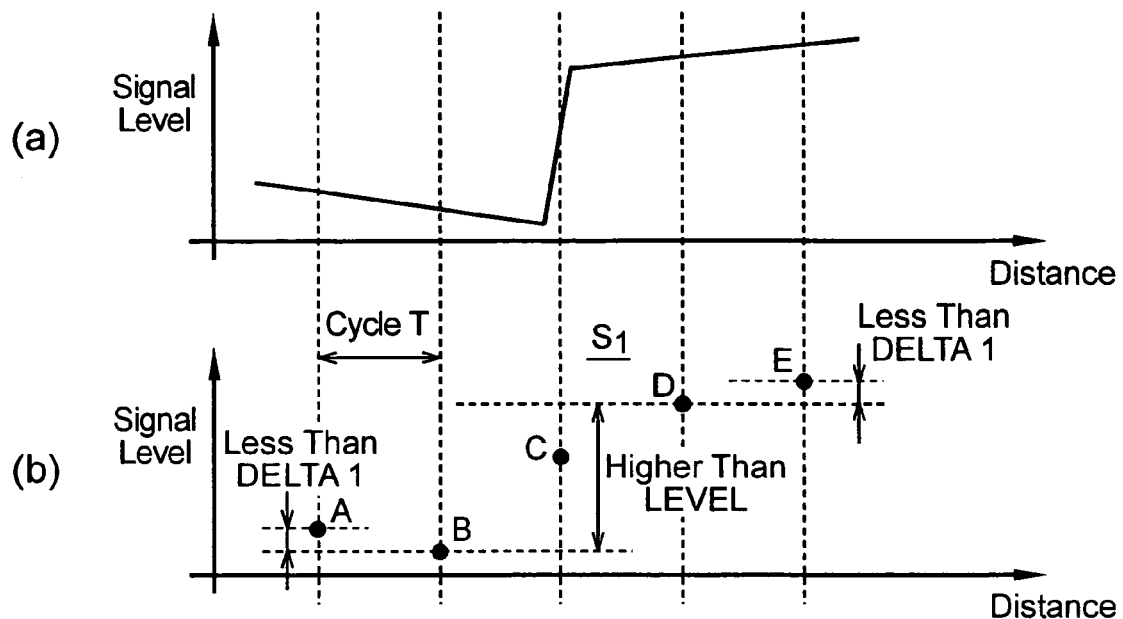
FIG. 5 is a drawing showing the one specific example of a digital video signal that becomes a processing object of the edge detection means in FIG. 1.

FIG. 5 shows one specific example of the judgment sample period in which an edge can be judged based on this first edge criterion, and FIG. 5(b) is the digital video signal $S_1$ of the sample cycle T input to the edge detection means 2. FIG. 5(a) conveniently shows one example of the continuous waveform of this digital video signal $S_1$. This digital video signal $S_1$ samples the video signal shown in this FIG. 5(a) in the sample cycle T.

In FIG. 5(b), incidentally, a judgment sample period is specified as four times of the sample cycle T, that is, 4T, and the samples to be judged are specified as samples A to E. Furthermore, the signal levels of each of the samples A, B, C, D, E are specified as A, B, C, D, E, and another edge judgment described later is also specified in the same manner.

For such judgment sample periods A to E, the edge detection means 2, first, obtains the absolute value |A−B| of the difference of the signal levels of the first two samples A, B. When this value is lower than the threshold DELTA 1 ("Yes" in Step 100 of FIG. 4), a flat portion is assumed to exist between the samples A and B. Subsequently, the absolute value |B−C| of the difference of the signal levels of the samples B, C is obtained. When this value is lower than the threshold DELTA 1 ("Yes" in Step 101 of FIG. 4), the flat portion of the period of 2T is obtained, and, accordingly, an edge is assumed to be undetected (Step 301 of FIG. 4). The processing of this judgment sample period terminates and the same judgment processing starts in the next judgment sample period starting from the sample B shifting by the sample cycle T.

In FIG. 5(*b*), however, because the absolute value |B−C| exceeds the threshold DELTA 1 ("No" in Step 101 of FIG. 4), a flat portion is assumed to exist up to the sample B and, furthermore, the absolute value |C−D| of the difference of the signal levels of the samples C, D is obtained. When this value is lower than the threshold DELTA 1 ("Yes" in Step 102 of FIG. 4), the flat portion is assumed to exist even between the samples C and D. Accordingly, there are two flat portions sandwiching between the samples B and C. When the absolute value |B−C| of the signal levels of these B, C is higher than the threshold LEVEL ("Yes" in Step 109 of FIG. 4), an edge is assumed to exist between the samples B and C (Step 201 of FIG. 4). The judgment processing of these judgment sample periods A to E terminates and moves to the judgment processing of the next judgment sample period starting from the sample B.

When the absolute value |C−D| is higher than the threshold DELTA 1 ("No" in Step 102 of FIG. 4) and lower than the threshold DELTA 2 ("No" in step 103 of FIG. 4), or/and the absolute value |C−D| is higher than the thresholds DELTA 1, 2 ("No" in Step. 102 of FIG. 4 and "Yes" in Step 103) but when the signal level C is not higher or lower than the signal levels B, D ("No" in Step 106 of FIG. 4), the absolute value |D−E| of the difference of the signal levels of the samples D, E is obtained subsequently. When this value is lower than the threshold DELTA 1 ("Yes" in Step 104 of FIG. 4), a flat portion is assumed to exist between these D and E. Accordingly, the flat portion is assumed to exist between the samples A and B and between the samples C and D.

Subsequently, whether an edge is assumed to exist between the samples B and D is judged based on this judgment result. That is, when the signal level continues increasing or decreasing in the order of the samples B, C, D ("Yes" in Step 107 of FIG. 4: in FIG. 5(*b*) the signal level is increasing sequentially), and the absolute value |B−D| is higher than the threshold LEVEL ("Yes" in Step 110 of FIG. 4), an edge is assumed to exist between the samples B and D (Step 202 of FIG. 4).

As described above, for the digital video signal $S_1$ shown in FIG. 5(*b*) in which two flat portions exist, (when the absolute value |C−D| is lower than the threshold DELTA 1) between these flat portions, that is, between the samples B and C or (the absolute value |C−D| is higher than the threshold DELTA 1 between the samples B and D, and the signal levels B, C, D sequentially increase or decrease), an edge can be detected.

Furthermore, the judgment processing of the judgment sample periods A to E terminates, and, in the judgment processing of the judgment sample periods (sample B→sample A, sample C→sample B, . . . ) starting from the next sample B, the processing of Steps 100, 111, 112, 303 of FIG. 4 or Steps 100, 111, 112, 113, 117, 303 of FIG. 4 is performed. Consequently, an edge is not detected between the samples B and C or samples B and D in FIG. 5(*b*). That is, the same edge will not be detected twice or more.

Moreover, although the aforementioned case applied to an edge in which a signal level increases, the edge is judged using the absolute value of the difference of the signal levels between two samples. Accordingly, even for an edge in which the signal level decreases, the edge is judged in the same manner. Accordingly, in FIG. 5, if there is a trailing edge subsequently, the flat portion immediately before the edge and the flat portion behind this edge are detected. Consequently, this trailing edge is detected in the same way as described above.

(2) As a second edge criterion of the edge judgement of the edge detection means 2, a flat portion of a signal level and a changing point, such as the crest of a peak or the root of a valley of a signal level fluctuation, are detected in the aforementioned judgment sample period and an edge is assumed to exist between the flat portion and this changing point (their sequence relations are ignored). The changing point is described specifically below as the crest of the peak or root of the valley from the relation with a drawing.

Figure 6:
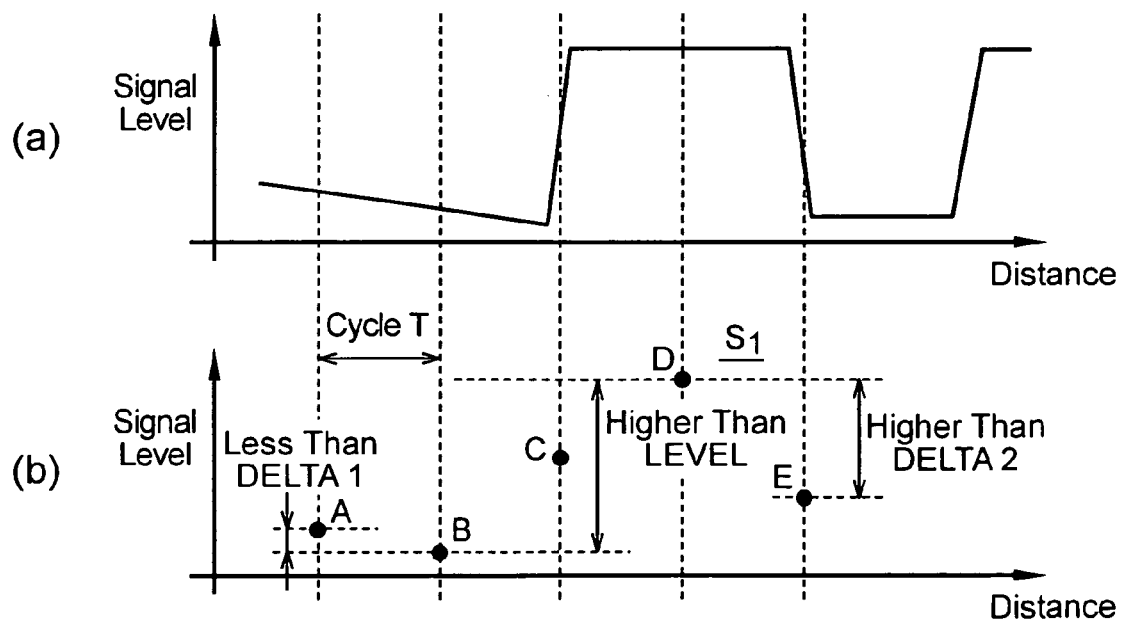
FIG. 6 is a drawing showing another specific example of the digital video signal that becomes the processing object of the edge detection means in FIG. 1.

FIG. 6 shows one specific example of the judgment sample period in which an edge can be judged based on this second edge criterion, and, in this specific example, a flat portion and the crest of a peak are detected. FIG. 6(*b*) is the digital video signal $S_1$ of the sample cycle T input to the edge detection means 2. FIG. 6(*a*) conveniently shows an example of the continuous waveform of this digital video signal $S_1$, and, as illustrated, shows the start portion of a picture that represents a striped pattern in which light and shade are repeated every period of less than 2T. The digital video signal $S_1$ samples the video signal shown in this FIG. 6(*a*) in the same cycle T. Even in this specific example, the judgment sample period is specified as 4T, and the samples to be judged are specified as the samples A to E.

In FIG. 6(*b*), the judgment between the samples A and B, the judgment between the samples B and C, and the judgment between the samples C and D are the same as the specific example shown in FIG. 5. Among the samples A to D, a flat portion is judged between the samples A and B by the judgment processing of Steps 100 to 103 (106) of FIG. 4.

Subsequently, the absolute value |D−E| of the difference of the signal levels of the samples D and E is obtained and whether this value is lower than a threshold or not is judged. Incidentally, when this absolute value |D−E| is higher than the threshold DELTA 1 ("No" in Step 104 of FIG. 4) and is higher than the threshold DELTA 2 ("Yes" in Step 105 of FIG. 4), a flat portion is not assumed to exist between the samples D and E. Accordingly, in the aforementioned first criterion, an edge cannot be judged between the samples B and D not sandwiched by two flat portions and the judgment enters a held state.

Incidentally, in this specific example, the second criterion is applied. That is, the sample D has a higher signal level than the samples B, C, E and forms the crest of a peak or has a lower signal level and forms the root of a valley ("Yes" in Step 108 of FIG. 4) and, when the absolute value |B−D| of the difference of the signal levels of the samples B, D is higher than the threshold LEVEL ("Yes" in Step 110 of FIG. 4 ), an edge is judged between the samples B and D (Step 202 of FIG. 4). In other cases (that is, the judgment "No" of Steps 105, 108, 110), the edge is not assumed to exist between the samples B and D (Step 303).

Furthermore, in FIG. 6(*b*), when the sample C among the samples B, C, D is the crest of a peak or the root of a valley (Steps 103, 106, 109), an edge is assumed to exist between the samples B and C (Step 201 of FIG. 4).

When the digital video signal $S_1$ samples a digital signal consisting of a series of rectangular waves of high frequency using a fine striped pattern of a picture, the edge at the head of the first rectangular wave that cannot be detected in the aforementioned first criterion according to this second criterion.

Furthermore, even in the specific example shown in this FIG. 6(b), in the next sample period (in this case, sample B→sample A, sample C→sample B, . . . ) starting from the sample B, the processing of 119, 304 or 116, (120), 305 is performed from Steps 100, 111, 112, 113, 114, 118, 115 of FIG. 4. An edge is not judged between the samples B and D once the edge was judged in the processing of the previous judgment sample periods A to E. Accordingly, the same edge is not detected twice or more.

(3) As a third edge criterion of the edge judgment of the edge detection means 2, when the crest of a peak and the root of a valley are detected in the aforementioned judgment sample periods, an edge is assumed to exist between these crest of the peak and root of the valley.

Figure 7:
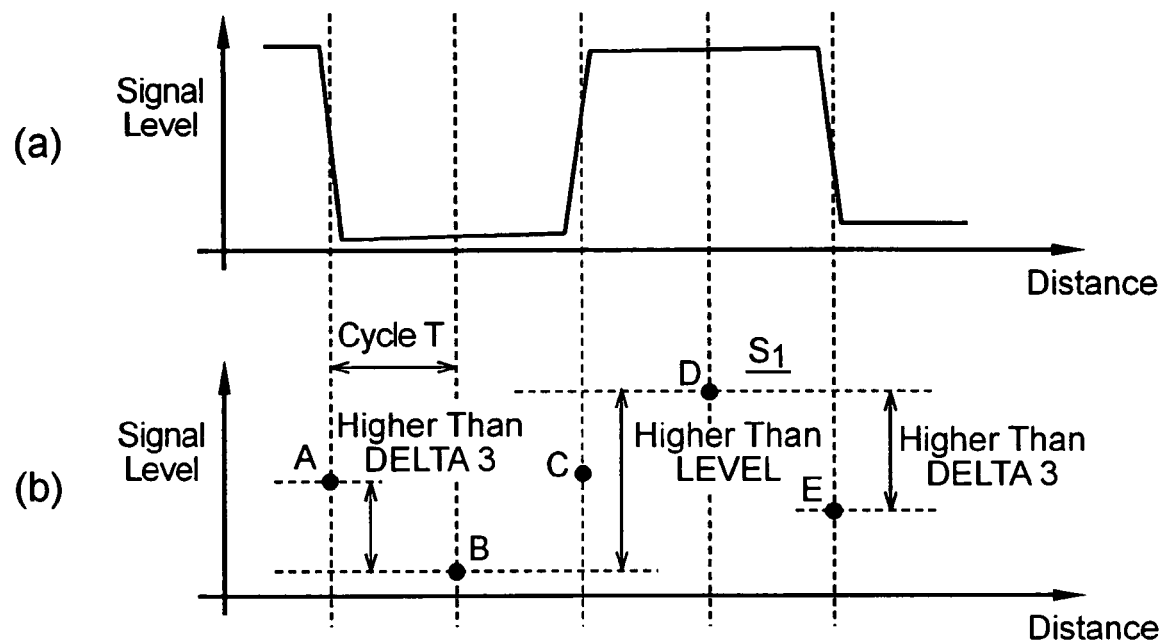
FIG. 7 is a drawing showing a further specific example of the digital video signal that becomes the processing object of the edge detection means in FIG. 1.

FIG. 7 shows one specific example of the judgment sample periods in which an edge can be judged based on this third edge criterion. In this specific example, the crest of a peak and the root of a valley are detected. FIG. 7(b) is the digital video signal $S_1$ of the sample cycle T input to the edge detection means 2. FIG. 7(a) conveniently shows the intermediate portion of an example of the continuous waveform of this digital video signal $S_1$, and, as illustrated, shows a picture that represents a striped pattern in which light and shade are repeated every period of 2T or less. The digital video signal $S_1$ samples the video signal shown in this 7(a) in the sample cycle T. Even in this specific example, the judgment sample period is specified for 4T and the samples to be judged are specified as the samples A to E.

In FIG. 7(b), for these judgment sample periods A to E, the edge detection means 2, first, obtains the absolute value |A−B| of the difference of the signal levels of the first two samples A, B. This is judged to be higher than the threshold DELTA 1 ("No" in Step 100 of FIG. 4) and higher than the threshold DELTA 2 ("Yes" in Step 111 of FIG. 4). Subsequently, the absolute value |B−C| of the difference of the signal levels of the samples B, C is obtained and this value is judged to be higher than the threshold DELTA 1 ("No" in Step 112 of FIG. 4). Furthermore, when the absolute value |B−C| is lower than the threshold DELTA 1 ("Yes" in Step 112 of FIG. 4), a flat portion is assumed to exist between the samples B and C. Accordingly, an edge is assumed to be undetected (Step 303 of FIG. 4) and processing moves to the processing between the next judgment sample periods.

Subsequently, the absolute value |C−D| of the difference of the signal levels of the samples C, D is obtained. When this is higher than the threshold 1 ("No" in Step 113 of FIG. 4) and is lower than the threshold DELTA 2 ("No" in Step 114 of FIG. 4) or is higher than the threshold DELTA 2 ("Yes" in Step 114 of FIG. 4), the signal levels of the samples A, B, C, D are A>B<C<D ("No" in Step 118 of FIG. 4). Accordingly, the absolute value |D−E| of the difference of the signal levels of the samples D, E is obtained and whether this value is higher than the threshold DELTA 1 or not is judged (Step 115 of FIG. 4). In this case, the absolute value |D−E| is higher than the threshold DELTA 1 ("No" in Step 115 of FIG. 4) and is higher than the threshold 2 ("Yes" in Step 116 of FIG. 4). Furthermore, because the signal levels of the samples A to E are A>B<C<D>E ("Yes" in Step 120 of FIG. 4), the sample B is judged as the root of a valley and the sample D is judged as the crest of a peak.

Subsequently, the absolute value |B−D| of the difference of the signal levels of the samples B, D is obtained between the root of this valley and the crest of this peak. When this value is higher than the threshold LEVEL ("Yes" in Step 11 of FIG. 4), an edge is judged between these samples B and D (Step 204).

Further, in FIG. 7(b), when the sample C is the crest of a peak instead of the sample D, processing advances from Step 114 of FIG. 4 to Step 118 and "Yes" is judged. The sample B is judged as the root of a valley and the sample C is judged as the crest of the peak. Furthermore, when the absolute value |B−C| of the difference of the signal levels between the samples B and C is higher than the threshold LEVEL ("Yes" in Step 11d of FIG. 4), an edge is judged between the sample B of the root of the valley and the sample C of the crest of the peak (Step 203).

Moreover, in FIG. 7(b), when a flat portion is assumed to exist between the samples C and D ("Yes" in Step 113 of FIG. 4), the signal levels of the samples A, B, C are A>B<C ("Yes" in Step 117 of FIG. 4). Accordingly, the sample B is judged as the root of a valley. According to the aforementioned second criterion, when the absolute value |B−C| of the difference of the signal levels with this sample B and the sample D at the head of the flat portion is higher than the threshold LEVEL ("Yes" in Step 11d of FIG. 4), an edge is judged between the samples B and C (Step 204 of FIG. 4).

Further, in FIG. 7(b), when a flat portion is assumed to exist between the samples D and E ("Yes" in Step 115 of FIG. 4), the signal levels of the samples B, C, D are B<C<D ("Yes" in Step 119 of FIG. 4). Accordingly, the sample B is judged as the root of a valley. According to the aforementioned second criterion, when the absolute value |B−C| of the difference of the signal levels with this sample B and the sample C at the head of the flat portion is higher than the threshold LEVEL ("Yes" in Step 11d of FIG. 4), an edge is judged between the samples B and D (Step 203 of FIG. 4).

Furthermore, in the specific example shown in FIG. 7, a leading edge was detected between the samples B and C or between the samples B and D, but processing is performed using the absolute value of the difference of signal levels. Accordingly, a trailing edge is detected in the same manner.

Except the aforementioned case, an edge is not judged between the samples B and C or between the samples B and D (Steps 304, 305 of FIG. 4).

Returning to FIG. 1, the edge detection means 2 detects an edge of an input digital video signal $S_1$ in this manner.

The edge generation means 3 generates the edge signal $S_E$ using the edge period of the digital video signal $S_1$ detected by the edge detection means 2 and the edge coefficient K supplied from an interpolation control means that is not illustrated.

Figure 8:
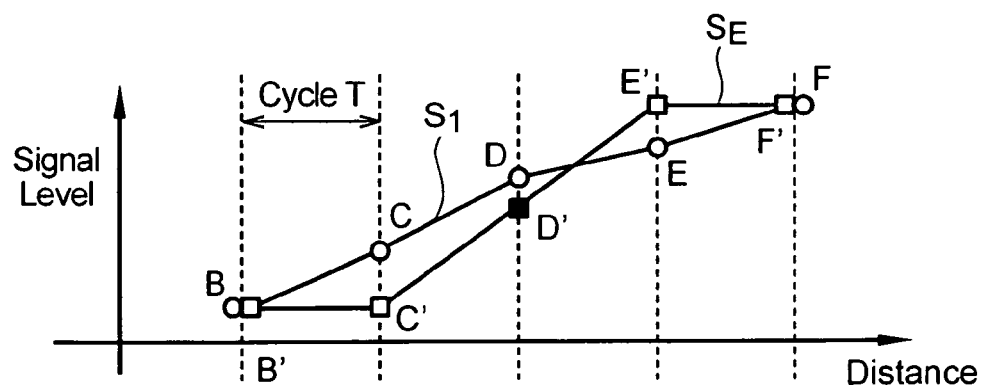
FIG. 8 is a drawing showing the one specific example of the operation of an edge generation means in FIG. 1.

FIG. 8 shows an edge period detected by the edge detection means 2. Each of B to F marked with a circle is the sample of the digital video signal $S_1$ in this edge period and each of B' to F' marked with a square and a black square is the sample of the edge signal $S_E$ in this edge period.

The edge generation means 3 sequentially generates the samples B', C', D', E', F' corresponding to an edge period detected by the edge detection means 2, for example, the samples B, C, D, E, F of the digital video signal $S_1$. Supposing that the first sample B' of the edge period is the first sample and the j-th (where, j=1, 2, 3, 4, 5) sample signal level is $V_j$, it follows that $$V_j = B + \beta_j \times (F - B) \qquad (1)$$

Where, B, F: Signal levels of samples B, F $$0 \leq \beta_j \leq 1$$

In FIG. 8, the edge generation means 3 obtains a signal level $$V_K=(B+D)/2$$

assuming $\beta_j=1/2$ in the above expression (1). Among the samples within the edge period of the digital video signal $S_1$, a sample (in FIG. 8, sample D) of this signal level $V_k$ of the edge signal $S_E$ is generated at the timing of the sample (in FIG. 8, sample D) of the signal level most approximate to this signal level $V_K$. The signal levels (in this case, signal levels $V_1$, $V_2$ of the samples B', C') of all samples that precede this sample D' are specified as signal level B when $\beta_j=0$ in the aforementioned expression (1) and the signal levels (in FIG. 8, signal levels $V_4$, $V_5$ of samples E', F') of all samples following this sample (in FIG. 8, sample D') are specified as signal level F when $\beta_j=1$ in the aforementioned expression (1).

Accordingly, the efficient $\beta_j$ of the signal level $V_j$ from the sample B' in the aforementioned expression (1) in this case appears as 0, 0, 0, 1/2, 1, 1, 1

This coefficient $\beta_j$ is supplied from an interpolation control means that is not illustrated as an edge coefficient K.

Furthermore, this edge coefficient $\beta_j$ is not limited to only this, but it can be set optionally as occasions demand, such as 0, 0, 0, 1, 1, 1, 1 or 0, 0, 1/3, 2/3, 1, 1, 1 or 0, 0, 1/5, 1/2, 4/5, 1, 1

The edge signal $S_E$ generated by the edge generation means 3 in this manner is supplied to the mixing means 4. This edge signal $S_E$ and the digital video signal $S_3$ from the contour correction means 1 are mixed at a desired ratio and the digital video signal $S_3$ is generated.

Figure 9:
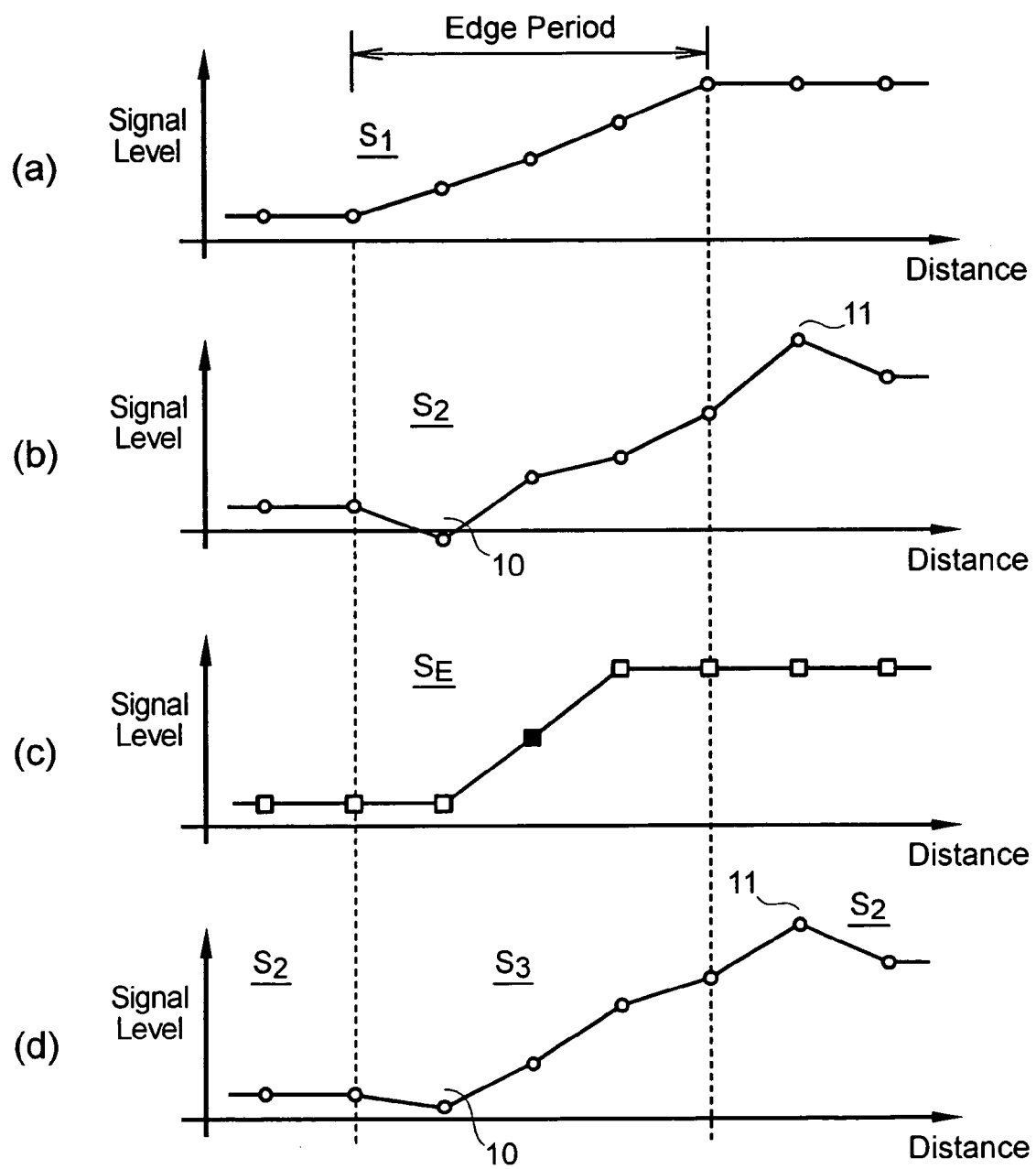
FIG. 9 is a drawing for describing a video signal output from a selection means in FIG. 1.

FIG. 9 shows the situation. When the input digital video signal $S_1$ shown in FIG. 9(a) is corrected for a contour by the contour correction means 1, as shown in FIG. 9(b), an undershoot 10 occurs in the start portion of the period that corresponds to an edge period detected by the edge detection means 2 and an overshoot 11 occurs immediately after the period that corresponds to this edge period.

FIG. 9(c) shows the aforementioned edge signal $S_E$ in the edge period generated by the edge generation means 3 and detected by the edge detection means 2. This signal and the digital video signal $S_2$ shown in FIG. 9(b) are mixed by the mixing means 4 at a predetermined ratio. Subsequently, the digital video signal $S_2$ shown in FIG. 9(b) is substituted for the digital video signal $S_3$ from the mixing means 4 by the selection means 5 in the edge period detected by the edge detection means 2. FIG. 9(d) shows a digital video signal output from the selection means 5. This digital video signal consists of the digital video signal $S_3$ from the mixing means 4 when the period corresponds to the edge period detected by the edge detection means 2. Because this digital video signal $S_3$ is mixed with the edge signal $S_E$, the undershoot 10 generated in the start portion of this edge period by the correction processing of the contour correction means 1 is reduced or suppressed.

The undershoot 10 generated by the correction processing of the contour correction means 1 can be reduced or suppressed in this manner and the generation of a black edge that occurs in the contour portion of a picture can be suppressed. As the luminance level difference of an edge that forms the contour portion increases, the black edge appears more remarkably. By the aforementioned processing of this embodiment, however, the generation of this type of black edge can be suppressed and a picture having good image quality can be obtained.

Moreover, in the edge period of the digital video signal $S_3$, because the edge signal $S_E$ is mixed with the output digital video signal $S_2$ of the contour correction means 1, an edge having a steeper slope is generated in comparison with this digital video signal $S_2$. Accordingly, in a picture using a digital video signal output from the selection means 5, the black edge in the contour portion does not become highlighted. At the same time, in the picture, the contour portion becomes more vivid and the sharpness is improved.

Furthermore, the overshoot 11 is generated in an edge by the correction processing of the contour correction means 1. Because this overshoot appears immediately after an edge period, however, it is not affected by the mixing of the edge signal $S_E$ but remains as is. Accordingly, the contour portion of a picture is represented remarkably and a high-quality picture of high sharpness is obtained suppressing the generation of a black edge.

Moreover, in FIG. 9, a leading edge (contour portion) is described as an example. In a trailing edge (contour portion), however, an overshoot caused by contour correction is added behind the contour portion. Accordingly, the overshoot is shifted later from an edge period in which the edge detection unit 3 (FIG. 1) detects from the input digital video signal $S_1$. Incidentally, the edge detection means 2 shifts edge detection timing, and, accordingly, the edge signal $S_E$ the edge generation means 3 generates and the operation of the selection are delayed for the shift of this edge detection timing. For example, when the contour correction means 1 corrects a contour by the method described in FIGS. 2 and 3, an undershoot added to a falling contour portion is delayed by only 2T twice of the sample cycle T in comparison with the contour portion of the input digital video signal $S_1$. Incidentally, when the edge detection portion detects an edge (contour portion), whether the contour portion is a rising contour portion or not is judged by comparing the signal level between the start sample and the end sample. When the contour portion is the falling contour portion, the generation start of the edge signal $S_E$ of the edge generation means 3 is delayed only by 2T and the operation of the selection means 5 is delayed in the same manner.

Furthermore, in the aforementioned embodiment, only the undershoot caused by the contour correction in a contour portion is suppressed, but an overshoot may also be suppressed. Accordingly, an abnormal "glare" in the contour portion of a picture can also be removed. To perform such correction processing, a period (that is, edge period) at which the video signal $S_3$ of the selection means 5 in FIG. 1 is prolonged. The period can be prolonged until the period in which an overshoot exists after the edge period of the contour portion terminates. For example, when FIG. 9 is cited as an example, the period in which the selection means 5 selects the video signal $S_3$ is prolonged until the period in which the overshoot occurs in comparison with the illustrated edge period. Needless to say, the edge signal $S_E$ is also created at least until this extended period. Moreover, consequently, even when the contour portion consists of a trailing edge, the same edge signal $S_E$ as this can be used.

Even if an undershoot is suppressed in this manner, and even if an overshoot is suppressed, an edge becomes steeper in comparison with the result of the correction processing of the contour correction means 1 by the mixing processing of the mixing means 4 and a contour correction effect is improved.

Figure 10:
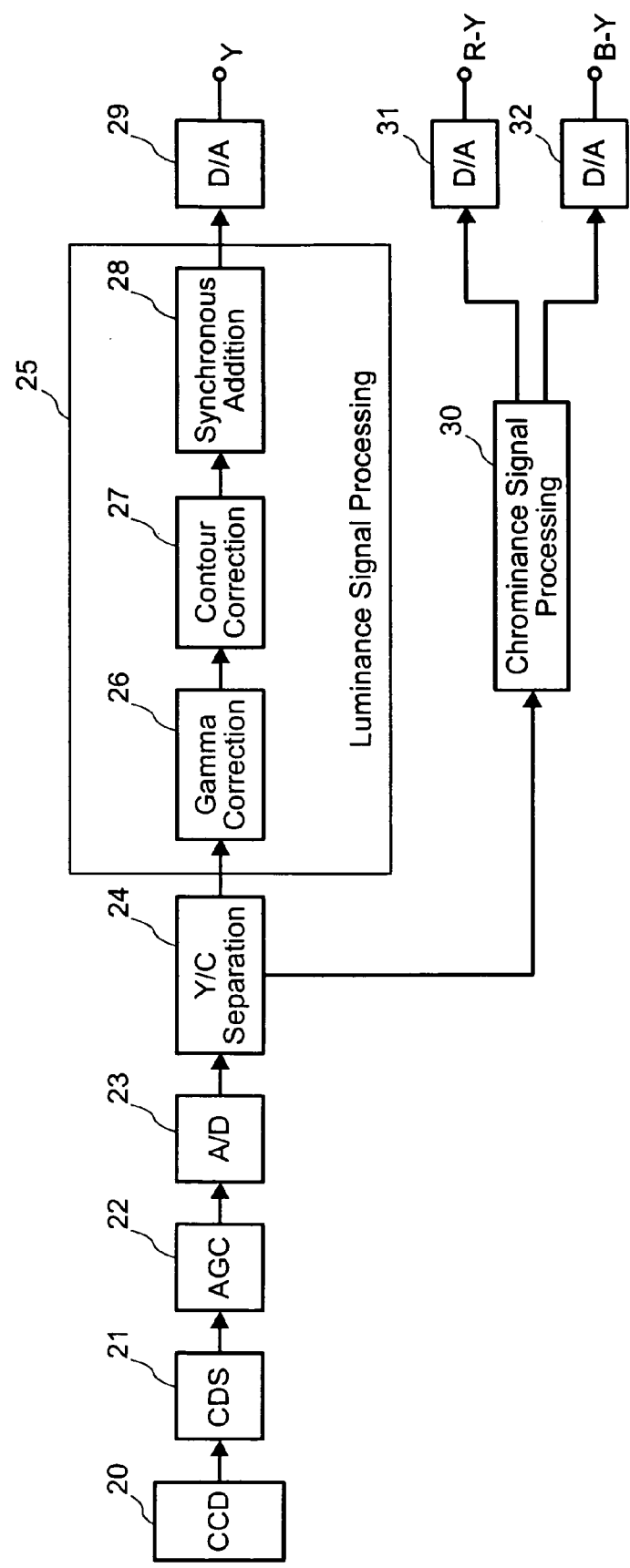
FIG. 10 is a block diagram showing the one embodiment of a camera device and its imaging method according to the invention.

FIG. 10 is a block diagram showing one embodiment of a camera device and its imaging method according to the invention using the video signal processing apparatus described above. Numeral 11 is a CCD (Charge Coupled Device) image sensor, 12 is a CDS (Correlated Double Sampling) circuit, 13 is an AGC (Automatic Gain Control) circuit, 14 is an A/D (Analog/Digital) converter, 15 is a Y (luminance)/C (chroma) separation circuit, 16 is a luminance signal processing circuit, 17 is a gamma correction circuit, 18 is a contour correction circuit, 19 is a synchronous addition circuit, 20 is a D/A (Digital/Analog) converter, 21 is a chrominance signal processing circuit, and 22, 23 are D/A converters.

In FIG. 10, the CCD image sensor 11 photographs a picture that is not illustrated and outputs an electric signal in accordance with this picture. In this electric signal, a waveform is formed through the CDS circuit 12 and a pixel signal is sampled. In the electric signal, after a gain is controlled so that amplitude may be made constant through the AGC circuit 13, a digital video signal is generated by supplying the electric signal to the A/D converter 14. This digital signal is separated into a digital luminance signal Y and a digital chrominance signal C through the Y/C separation circuit 15. The digital luminance signal Y is supplied to the luminance signal processing circuit 16 and the digital chrominance signal C is supplied to the chrominance signal processing circuit 21 respectively.

In the luminance signal processing circuit 16, after the input digital luminance signal Y is gamma-corrected through the gamma correction circuit 17, a contour portion is corrected through the contour correction circuit 18 and a synchronous signal is added through the synchronous addition circuit 19. The digital luminance signal Y for which the aforementioned processing was performed is output from the luminance signal processing circuit 16 and converted to an analog luminance signal by the D/A converter 20. For example, the luminance signal Y having a predetermined system such as an NTSC (National Television System Committee) system is obtained.

On the other hand, after processing, such as separation into a primary colors signal, white balance, or gamma correction, is performed to the digital chrominance signal C separated through the Y/C separation circuit 15, digital color difference signals R-Y, B-Y are generated, and modulated respectively. These digital color difference signals R-Y, B-Y are supplied to the D/A converters 22, 23 respectively and converted to an analog signal. The color difference signals R-Y, B-Y having the predetermined system such as the NTSC system are obtained.

This embodiment uses a video signal processing apparatus according to the invention described previously as the contour correction circuit 18 of the luminance signal processing circuit 16 in a camera device of this configuration. Accordingly, the luminance signal Y obtained from the D/A converter 20 is corrected for a counter, but it changes into a luminance signal because an undershoot is suppressed by this contour correction processing. In a picture based on a video signal obtained by this camera device, a black edge is not highlighted in the contour portion.

Furthermore, the embodiment shown in FIG. 10 shows one example of the invention. Even a camera device of any configuration having a contour correction circuit including this example can use the video signal processing apparatus shown as the aforementioned embodiment, as this contour correction circuit. Accordingly, needless to say, the camera device according to the invention is constructed.

As described above, according to the invention, the generation of a black edge in the contour portion of a picture caused by contour correction can be suppressed and the glare in the contour portion can be suppressed. A picture having high image quality can be obtained holding the sharpness of the image caused by contour correction satisfactorily.

Subsequently, another embodiment of the invention is described.

Figure 11:
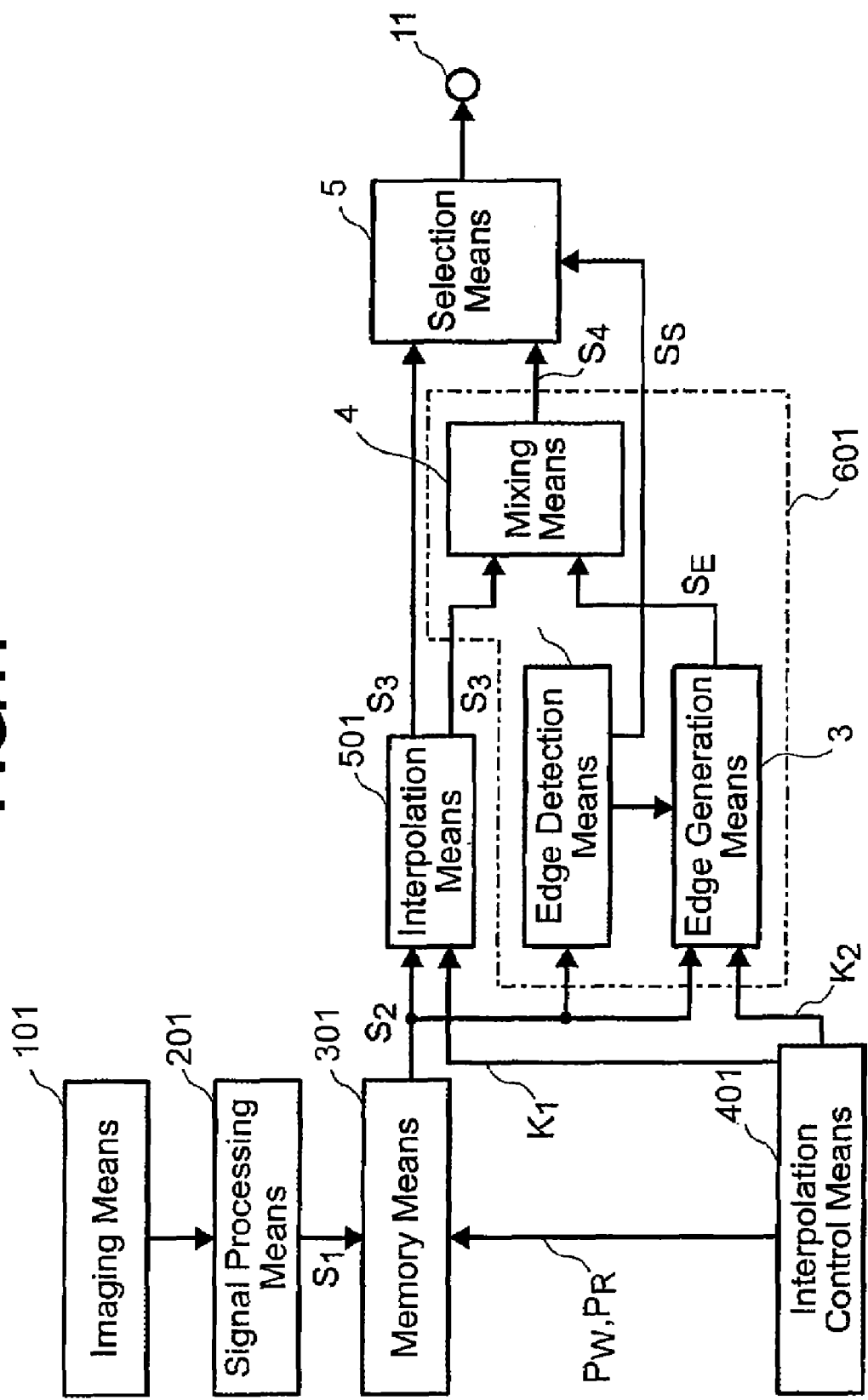
FIG. 11 is a block diagram showing the configuration of the one embodiment of an interpolation device and method and a camera device and its imaging method.

FIG. 11 is a block diagram of one embodiment of an interpolation device and interpolation method according to the invention, and a camera device and its imaging method. Numeral 1 is an imaging means, 2 is a signal processing means, 3 is a memory means, 4 is an interpolation control means that controls an interpolation using a timing pulse and an interpolation coefficient, 5, 6 are interpolation means, 7 is an edge detection means, 8 is an edge generation means, 9 is a mixing means, 10 is a selection means, and 11 is an output terminal.

In FIG. 11, an electric signal obtained by the photographing of the imaging means 101 is supplied to the signal processing means 201 and the digital video signal $S_1$ of the sample (pixel) cycle t is generated. This digital video signal $S_1$ is written to the memory means 301 at the timing of the sample cycle t every sample with the write timing pulse $P_W$ generated by the interpolation control means 401, and a sample is sequentially read with the read timing pulse $P_R$ generated by the interpolation control means 401 in the four-time timing of the sample cycle t. Moreover, the sample is read by 1H every 4H (H is a horizontal scanning period) in a vertical scanning direction. Accordingly, the one fourth portion of the sample is sampled with the digital video signal $S_1$ input to the memory means 301. Consequently, the digital video signal $S_2$ of a picture (hereinafter referred to as an enlarged picture) enlarged into four times in horizontal/vertical scanning directions respectively is obtained.

Figure 12:
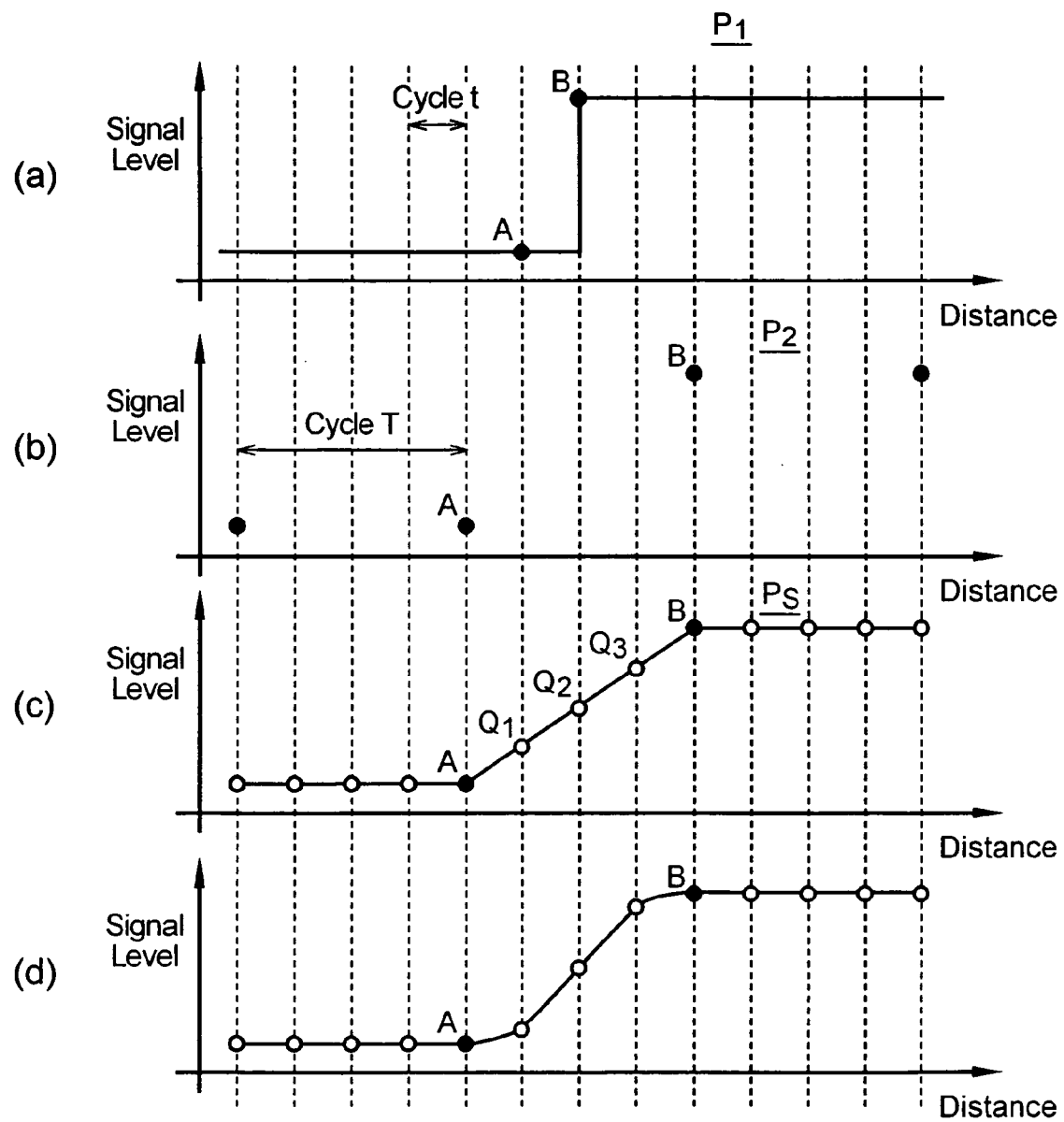
FIG. 12 is a drawing showing one example of the interpolation method of the interpolation device in FIG. 11.

As shown in FIG. 12, the interpolation means 501, 601, the selection means 5, and the interpolation control means 401 constructs an interpolation device. The digital video signal $S_2$ is supplied to the interpolation means 501, 601 of this interpolation device. The interpolation means 601 consists of the edge detection means 2, the edge generation means 3, and the mixing means 4. In the interpolation means 501, a digital video signal of the sample cycle T is interpolated linearly (also in a vertical scanning direction, the linear interpolation of a horizontal scanning line is performed, but the linear interpolation in the vertical scanning direction is not described) using the interpolation coefficient $K_1$ generated by the interpolation control means 401, and a digital video signal $S_3$ of the sample cycle t is obtained. This digital video signal $S_3$ is supplied to the selection means 5 and the mixing means 4 of the interpolation means 601.

On the other hand, in the interpolation means 601, when the edge detection means 2 detects the edge of the digital video signal $S_2$ of an enlarged picture by the method described later, the edge generation means 3 generates an edge signal $S_E$ consisting of the sample of the cycle t using the digital video signal $S_2$ and the edge coefficient $K_2$ described later generated by the interpolation control means 401 based on the detection result. This edge signal $S_E$ is supplied to the mixing means 4 and mixed with the digital video signal $S_3$ output from the interpolation means 501. The edge generation means 3 and the mixing means 4 forms an edge enhancement means in this manner that enhances the edge of the digital video signal $S_3$ interpolated from the interpolation means 501.

A digital video signal $S_4$ with which the edge signal $S_E$ output from this mixing means 4 is mixed is supplied to the selection means 5 as an output signal of the interpolation means 601. This selection means 5 is controlled using a selection control signal $S_S$ in the period of this edge generated when the edge detection means 2 detected the edge of the digital video signal $S_2$, and selects, in the edge period, the output digital video signal $S_4$ of the interpolation means 601, and, in a period other than the edge period, the output digital video signal $S_3$ of the interpolation means 501. Accordingly, the output digital video signal $S_3$ of the interpolation means 501 is obtained in an output terminal 11 in the edge period by interpolating the output digital video signal $S_4$ of the interpolation means 601.

In the interpolation means 501, the digital video signal $S_2$ is interpolated using the linear interpolation described in FIG. 12, but this linear interpolation is described with reference to FIGS. 12(*b*), (*c*).

Incidentally, supposing a picture $P_2$ of the sample cycle T shown in FIG. 12(*b*) is a picture $P_3$ of the sample cycle t (=T/4), three samples are interpolated between the adjacent samples of the picture $P_2$. In linear interpolation, a straight line connects between the adjacent samples, and a signal level of an interpolation sample is set so that the signal level on this straight line may be obtained.

Incidentally, in FIG. 12(*b*), the signal levels of the adjacent two samples A, B are A, B respectively, a signal level $Q_1$ of an interpolation sample $Q_1$ (where, I=1, 2, 3) interpolated between these samples A and B is represented as $$Q_1 = \frac{A \times (4-i)}{4} + \frac{B \times i}{4} \quad (1)$$

For a flat portion, because A≈B, it follows that $Q_1$≈A. Moreover, for an edge, because B=α×A (where, α>1), it follows that $Q_1 = A \times (3+\alpha)/4$ $Q_2 = A \times (2+2\alpha)/4$ $Q_3 = A \times (1+3\alpha)/4$ and the picture $P_3$ shown in FIG. 12(*c*) is generated.

The interpolation means 501 generates the interpolation sample Q1 by supplying (4−i)/4 and i/4 in the aforementioned expression (1) from the interpolation control means 401 as the interpolation coefficient $K_1$ and performing the operation of the aforementioned expression (1) every adjacent two samples in the picture $P_2$ shown in FIG. 12(*b*), and generates the picture $P_3$ shown in FIG. 12(*c*) interpolated using this sample. The signal of this picture $P_3$ is the digital video signal $S_3$ in FIG. 1.

Subsequently, the operation of the edge detection means 2 is described with reference to FIGS. 13 to 16.

Figure 13:
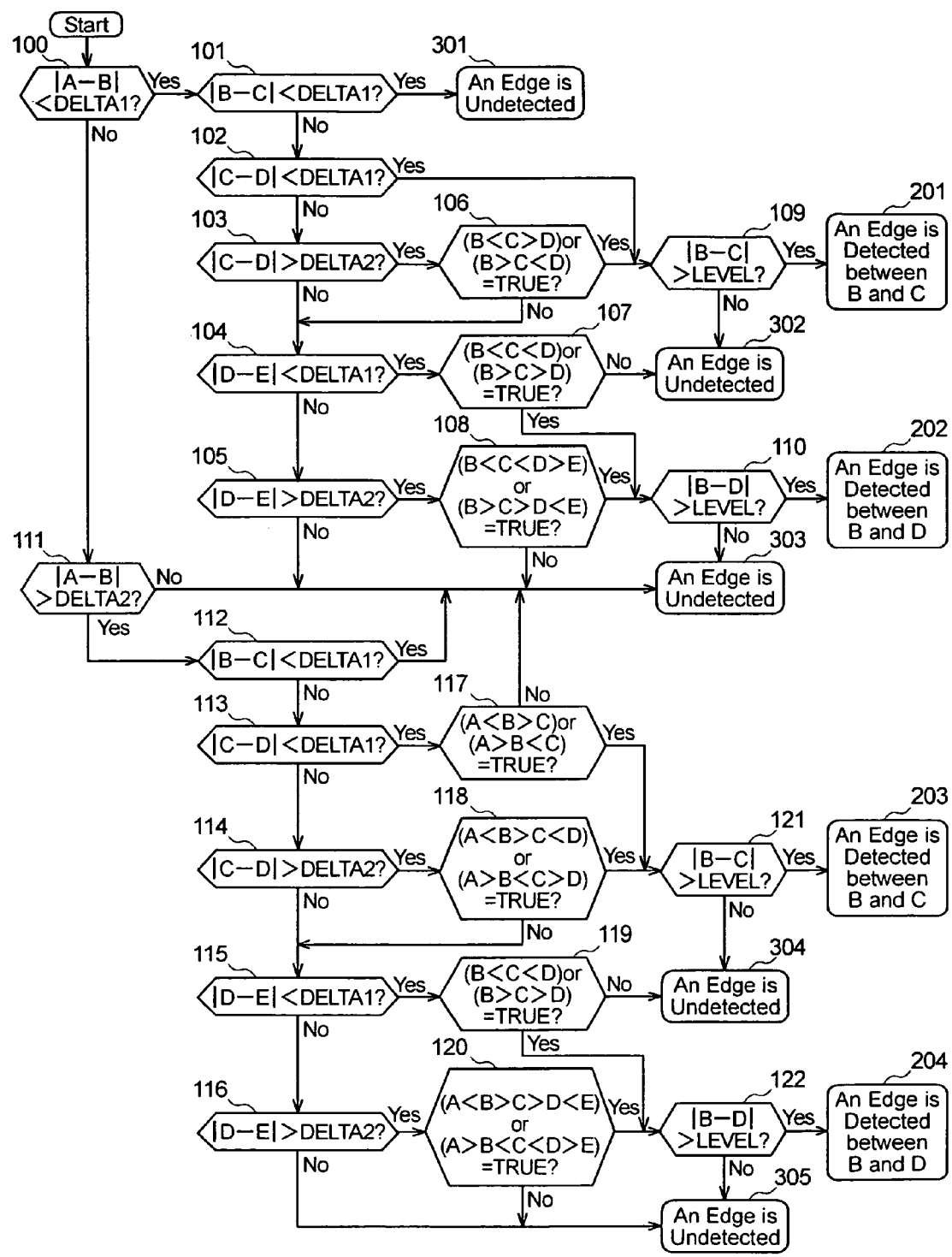
FIG. 13 is a flowchart showing the one specific example of the operation of the edge detection means in FIG. 11.

FIG. 13 is a flowchart showing one specific example of the edge detection operation of the edge detection means 2. This edge is judged regarding multiple sample periods (hereinafter referred to a judgment sample period) using three thresholds DELTA 1, DELTA 2, and LEVEL, and their relations are DELTA 1<DELTA 2 and DELTA 1<LEVEL.

This judgment sample period is set in such a degree that an edge of a striped pattern repeated in the minimum cycle on a picture can be judged. Incidentally, the threshold DELTA 1 is used for judging a flat portion (hereinafter referred to as a flat portion merely) of the picture. The threshold DELTA 2 is used for judging the crest of a peak of the picture or the root of a valley of the picture (hereinafter referred to as the crest of a peak or the root of a valley merely). The threshold LEVEL is used for judging an edge.

The edge detection operation of the edge detection means 2 is described below citing one specific example of an image pattern.

(1) As a first edge criterion of the edge judgment of the edge detection means 2, two flat portions that differ in a signal level are detected in the aforementioned judgment sample period. When no flat portion can be found between these flat portions, an edge is assumed to exist between these flat portions.

Figure 14:
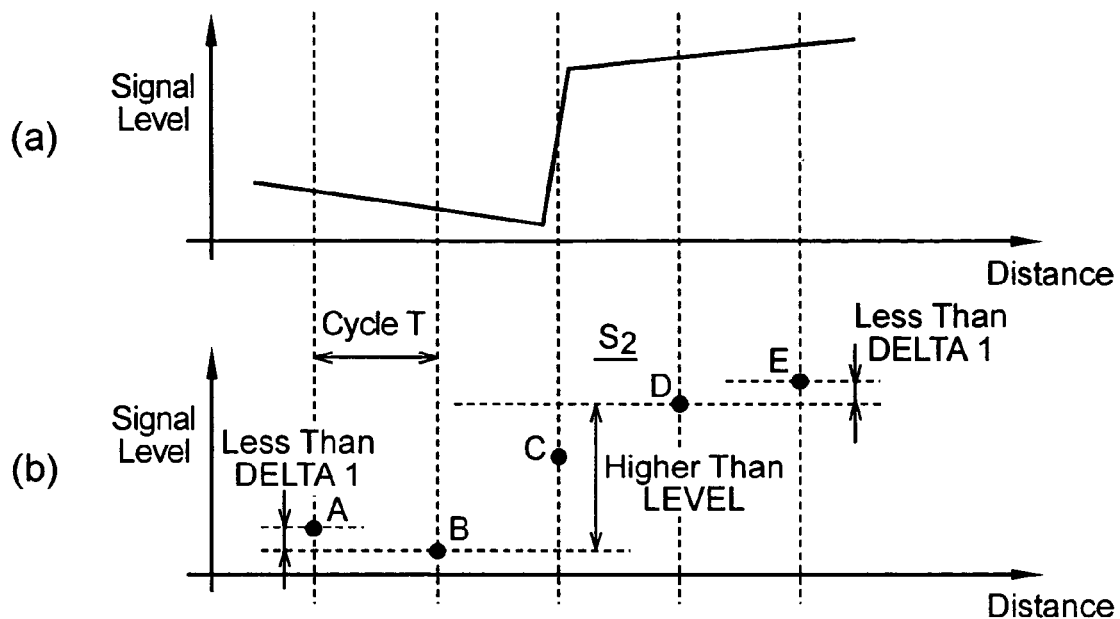
FIG. 14 is a drawing showing the one specific example of the digital video signal that becomes the processing object of the edge detection means in FIG. 11.

FIG. 14 shows one specific example of the judgment sample period in which an edge can be judged based on this first edge criterion, and FIG. 14(*b*) is the digital video signal $S_2$ of the sample cycle T input to the edge detection means 2. FIG. 14(*a*) conveniently shows an example of the continuous waveform of this digital video signal $S_2$. This digital video signal $S_2$ samples the video signal shown in this FIG. 14(*a*) in the sample cycle T.

In FIG. 14(*b*), incidentally, the judgment sample period is specified as four times of the sample cycle T, that is, 4T, and the samples to be judged are specified as samples A to E. Furthermore, the signal levels of each of the samples A, B, C, D, E are specified as A, B, C, D, E, and another edge judgment described later is also specified in the same manner.

For these judgment sample periods A to E, the edge detection means 2, first, obtains the absolute value |A−B| of the difference of the signal levels of the first two samples A, B. When this value is lower than the threshold DELTA 1 ("Yes" in Step 100 of FIG. 13), a flat portion is assumed to exist between the samples A and B. Subsequently, the absolute value |B−C| of the difference of the signal levels of the samples B, C is obtained. When this value is lower than the threshold DELTA 1 ("Yes" in Step 101 of FIG. 13), the flat portion of the period of 2T is obtained, and, accordingly, an edge is assumed to be undetected (Step 301 of FIG. 13). The processing of this judgment sample period terminates and the same judgment processing starts in the next judgment sample period starting from the sample B shifting by the sample cycle T.

In FIG. 14(*b*), however, because the absolute value |B−C| exceeds the threshold DELTA 1 ("No" in Step 101 of FIG. 13), a flat portion is assumed to exist up to the sample B and, furthermore, the absolute value |C−D| of the difference of the signal levels of the samples C, D is obtained. When this value is lower than the threshold DELTA 1 ("Yes" in Step 102 of FIG. 13), the flat portion is assumed to exist even between the samples C and D. Accordingly, there are two flat portions sandwiching between the samples B and C. When the absolute value |B−C| of the signal levels of these B, C is higher than the threshold LEVEL ("Yes" in Step 109 of FIG. 13), an edge is assumed to exist between the samples B and C (Step 201 of FIG. 13). The judgment processing of these judgment sample periods A to E terminates and moves to the judgment processing of the next judgment sample period starting from the sample B.

When the absolute value |C−D| is higher than the threshold DELTA 1 ("No" in Step 102 of FIG. 13) and lower than the threshold DELTA 2. ("No" in step 103 of FIG. 13), or/and the absolute value |C−D| is higher than the thresholds DELTA 1, 2 ("No" in Step 102 of FIG. 13 and "Yes" in Step 103) but when the signal level C is not higher or lower than the signal levels B, D ("No" in Step 106 of FIG. 13), the absolute value |D−E| of the difference of the signal levels of the samples D, E is obtained subsequently. When this value is lower than the threshold DELTA 1 ("Yes" in Step 104 of FIG. 13), a flat portion is assumed to exist between these D and E. Accordingly, the flat portion is assumed to exist between the samples A and B and between the samples C and D.

Subsequently, whether an edge is assumed to exist between the samples B and D is judged based on this judgment result. That is, when the signal level continues increasing or decreasing in the order of the samples B, C, D ("Yes" in Step 107 of FIG. 13: in FIG. 14(b) the signal level is increasing sequentially), and the absolute value |B−D| is higher than the threshold LEVEL ("Yes" in Step 110 of FIG. 13), an edge is assumed to exist between the samples B and D (Step 202 of FIG. 13).

As described above, for the digital video signal $S_2$ shown in FIG. 14(b) in which two flat portions exist, (when the absolute value |C−D| is lower than the threshold DELTA 1) between these flat portions, that is, between the samples B and C or (the absolute value |C−D| is higher than the threshold DELTA 1 between the samples B and D, and the signal levels B, C, D sequentially increase or decrease), an edge can be detected.

Furthermore, the judgment processing of the judgment sample periods A to E terminates, and, in the judgment processing of the judgment sample periods (sample B→sample A, sample C→sample B, . . . ) starting from the next sample B, the processing of Steps 100, 111, 112, 303 of FIG. 13 or Steps 100, 111, 112, 113, 117, 303 of FIG. 13 is performed. Consequently, an edge is not detected between the samples B and C or samples B and D in FIG. 14(b). That is, the same edge will not be detected twice or more.

Moreover, although the aforementioned case applied to an edge in which a signal level increases, the edge is judged using the absolute value of the difference of the signal levels between two samples. Accordingly, even for an edge in which the signal level decreases, the edge is judged in the same manner. Accordingly, in FIG. 14, if there is a trailing edge subsequently, the flat portion immediately before the edge and the flat portion behind this edge are detected. Consequently, this trailing edge is detected in the same way as described above.

(2) As a second edge criterion of the edge judgement of the edge detection means 2, a flat portion of a signal level and a changing point, such as the crest of a peak or the root of a valley of a signal level fluctuation, are detected in the aforementioned judgment sample period and an edge is assumed to exist between the flat portion and this changing point (their sequence relations are ignored). The changing point is described specifically below as the crest of the peak or root of the valley) from the relation with a drawing.

Figure 15:
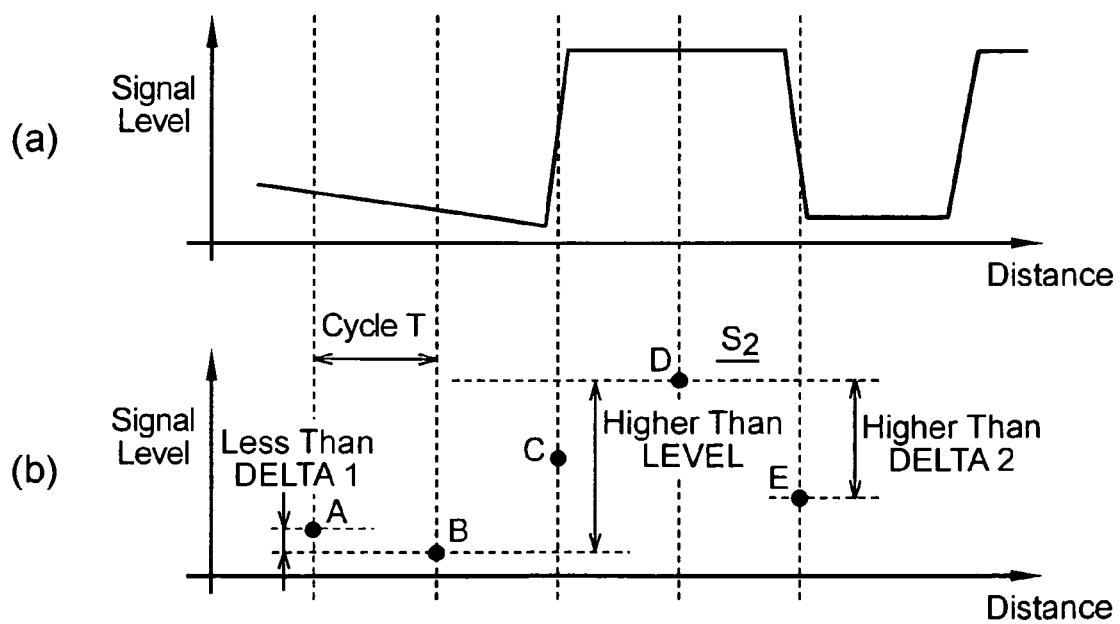
FIG. 15 is a drawing showing another specific example of the digital video signal that becomes the processing object of the edge detection means in FIG. 11.

FIG. 15 shows one specific example of the judgment sample period in which an edge can be judged based on this second edge criterion, and, in this specific example, a flat portion and the crest of a peak are detected. FIG. 15(b) is the digital video signal $S_2$ of the sample cycle T input to the edge detection means 2. FIG. 15(a) conveniently shows an example of the continuous waveform of this digital video signal $S_2$, and, as illustrated, shows the start portion of a picture that represents a striped pattern in which light and shade are repeated every period of less than 2T. The digital video signal $S_2$ samples the video signal shown in this FIG. 15(a) at the same cycle T. Even in this specific example, the judgment sample period is specified as 4T and the samples to be judged are specified as the samples A to E.

In FIG. 15(b), the judgment between the samples A and B, the judgment between the samples B and C, and the judgment between the samples C and D are the same as the specific example shown in FIG. 14. Among the samples A to D, a flat portion is judged between the samples A and B by the judgment processing of Steps 100 to 103 (106) of FIG. 13.

Subsequently, the absolute value |D−E| of the difference of the signal levels of the samples D and E is obtained and whether this value is lower than a threshold or not is judged. Incidentally, when this absolute value |D−E| is higher than the threshold DELTA 2 ("No" in Step 104 of FIG. 13) and is higher than the threshold DELTA 2 ("Yes" in Step 105 of FIG. 13), a flat portion is not assumed to exist between the samples D and E. Accordingly, in the aforementioned first criterion, an edge cannot be judged between the samples D and E not sandwiched by two flat portions and the judgment enters a held state.

Incidentally, in this specific example, the second criterion is applied. That is, the sample D has a higher signal level than the samples B, C, E and forms the crest of a peak or has a lower signal level and forms the root of a valley ("Yes" in Step 108 of FIG. 13) and, when the absolute value |B−D| of the difference of the signal levels of the samples B, D is higher than the threshold LEVEL ("Yes" in Step 110 of FIG. 13), an edge is judged between the samples B and D (Step 202 of FIG. 13). In other cases (that is, the judgment "No" of Steps 105, 108, 110), the edge is not assumed to exist between the samples B and D (Step 303).

Furthermore, in FIG. 15(b), when the sample C among the samples B, C, D is the crest of a peak or the root of a valley (Steps 103, 106, 109), an edge is assumed to exist between the samples B and C (Step 201 of FIG. 13).

When the digital video signal $S_2$ samples a digital signal consisting of a series of rectangular waves of high frequency using a fine striped pattern of a picture, the edge at the head of the first rectangular wave that cannot be detected in the aforementioned first criterion according to this second criterion.

Furthermore, even in the specific example shown in this FIG. 15(b), in the next sample period (in this case, sample B→sample A, sample C→sample B, . . . ) starting from the sample B, the processing of 119, 304 or 116, (120), 305 is performed from Steps 100, 111, 112, 113, 114, 118, 115 of FIG. 13. An edge is not judged between the samples B and D once the edge was judged in the processing of the previous judgment sample periods A to E. Accordingly, the same edge is not detected twice or more.

(3) As a third edge criterion of the edge judgment of the edge detection means 2, when the crest of a peak and the root of a valley are detected in the aforementioned judgment sample periods, an edge is assumed to exist between these crest of the peak and root of the valley.

Figure 16:
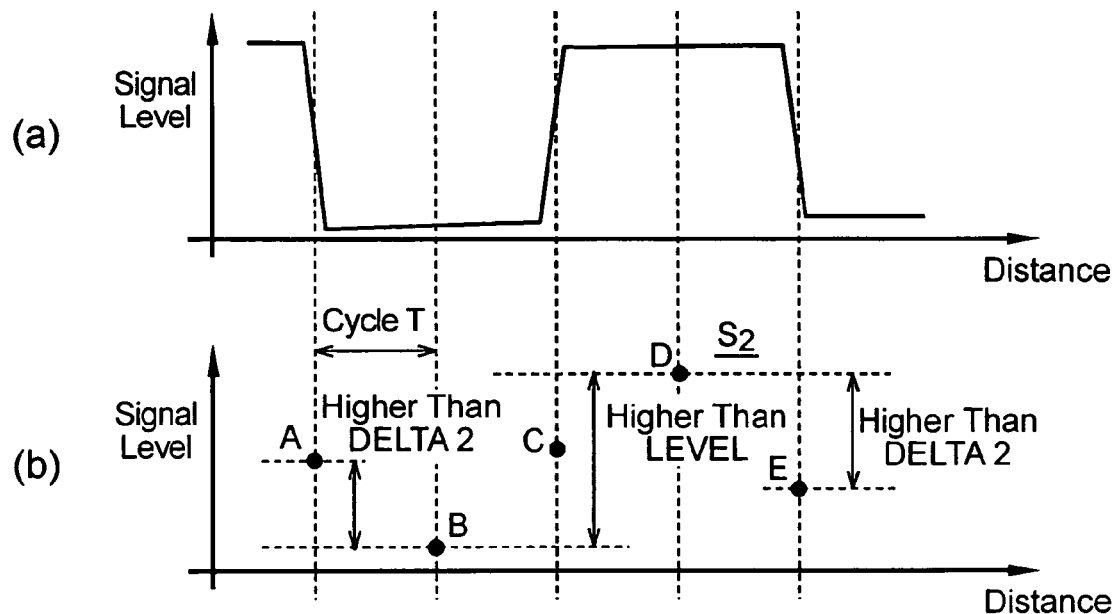
FIG. 16 is a drawing showing a further specific example of the digital video signal that is the processing object of the edge detection means in FIG. 11.

FIG. 16 shows one specific example of the judgment sample period in which an edge can be judged based on this third edge criterion. In this specific example, the crest of a peak and the root of a valley are detected. FIG. 16(b) is the digital video signal $S_2$ of the sample cycle T input to the edge detection means 2. FIG. 16(a) conveniently shows the intermediate portion of an example of the continuous waveform of this digital video signal $S_2$, and, as illustrated, shows a picture that represents a striped pattern in which light and shade are repeated every period of 2T or less. The digital video signal $S_2$ samples the video signal shown in this 16(a)

in the sample cycle T. Even in this specific example, the judgment sample period is specified for 4T and the samples to be judged are specified as the samples A to E.

In FIG. 16(b), for these judgment sample periods A to E, the edge detection means 2, first, obtains the absolute value |A−B| of the difference of the signal levels of the first two samples A, B. This is judged to be higher than the threshold DELTA 1 ("No" in Step 100 of FIG. 13) and higher than the threshold DELTA 2 ("Yes" in Step 111 of FIG. 13). Subsequently, the absolute value |B−C| of the difference of the signal levels of the samples B, C is obtained and this value is judged to be higher than the threshold DELTA 1 ("No" in Step 112 of FIG. 13). Furthermore, when the absolute value |B−C| is lower than the threshold DELTA 1 ("Yes" in Step 112 of FIG. 13), a flat portion is assumed to exist between the samples B and C. Accordingly, an edge is assumed to be undetected (Step 303 of FIG. 13) and processing moves to the processing between the next judgment sample periods.

In FIG. 16(b), for these judgment sample periods A to E, the edge detection means 7, first, obtains the absolute value |A−B| of the difference of the signal levels of the first two samples A, B. This is judged to be higher than the threshold DELTA 1 ("No" in Step 100 of FIG. 13) and higher than the threshold DELTA 2 ("Yes" in Step 111 of FIG. 13). Subsequently, the absolute value |B−C| of the difference of the signal levels of the samples B, C is obtained and this value is judged to be higher than the threshold DELTA 1 ("No" in Step 112 of FIG. 13). Furthermore, when the absolute value |B−C| is lower than the threshold DELTA 1 ("Yes" in Step 112 of FIG. 13), a flat portion is assumed to exist between the samples B and C. Accordingly, an edge is assumed to be undetected (Step 303 of FIG. 13) and processing moves to the processing between the next judgment sample periods.

Subsequently, the absolute value |C−D| of the difference of the signal levels of the samples C, D is obtained. When this in higher than the threshold 1 ("No" in Step 113 of FIG. 13) and is lower than the threshold DELTA 2 ("No" in Step 114 of FIG. 13) or is higher than the threshold DELTA 2 ("Yes" in Step 114 of FIG. 13), the signal levels of the samples A, B, C, D are A>B<C<D ("No" in Step 118 of FIG. 13). Accordingly, the absolute value |D−E| of the difference of the signal levels of the samples D, E is obtained and whether this value is higher than the threshold DELTA 1 or not is judged (Step 115 of FIG. 13). In this case, the absolute value |D−E| is higher than the threshold DELTA 1 ("No" in Step 115 of FIG. 13) and the higher than the threshold 2 ("Yes" in Step 116 of FIG. 13). Furthermore, because the signal levels of the samples A to E are A>B<C<D>E ("Yes" in Step 120 of FIG. 13), the sample B is judged as the root of a valley and the sample D is judged as the crest of a peak.

Subsequently, the absolute value |B−D| of the difference of the signal levels of the samples B, D is obtained between the root of this valley and the crest of this peak. When this value is higher than the threshold LEVEL ("Yes" in Step 11 of FIG. 13), an edge is judged between these samples B and D (Step 204).

Further, in FIG. 16(b), when the sample C is the crest of a peak instead of the sample D, processing advances from Step 114 of FIG. 13 to Step 118 and "Yes" is judged. The sample B is judged as the root of a valley and the sample C is judged as the crest of the peak. Furthermore, when the absolute value |B−C| of the difference of the signal levels between the samples B and C is higher than the threshold LEVEL ("Yes" in Step 121 of FIG. 13), an edge is judged between the sample B of the root of the valley and the sample C of the crest of the peak (Step 203).

Moreover, in FIG. 16(b), when a flat portion is assumed to exist between the samples C and D ("Yes" in Step 113 of FIG. 13), the signal levels of the samples A, B, C are A>B<C ("Yes" in Step 117 of FIG. 13). Accordingly, the sample B is judged as the root of a valley. According to the aforementioned second criterion, when the absolute value |B−C| of the difference of the signal levels with this sample B and the sample C at the head of the flat portion is higher than the threshold LEVEL ("Yes" in Step 121 of FIG. 13), an edge is judged between the samples B and C (Step 203 of FIG. 13).

Further, in FIG. 16(b), when a flat portion is assumed to exist between the samples D and E ("Yes" in Step 115 of FIG. 13), the signal levels of the samples B, C, D are B<C<D ("Yes" in Step 119 of FIG. 13). Accordingly, the sample B is judged as the root of a valley. According to the aforementioned second criterion, when the absolute value |B−C| of the difference of the signal levels with this sample B and the sample C at the head of the flat portion is higher than the threshold LEVEL ("Yes" in Step 122 of FIG. 13), an edge is judged between the samples B and D (Step 203 of FIG. 13).

Furthermore, in the specific example shown in FIG. 16, a leading edge was detected between the samples B and C or between the samples B and D, but processing is performed using the absolute value of the difference of signal levels. Accordingly, a trailing edge is detected in the same manner.

Except the aforementioned case, an edge is not judged between the samples B and C or between the samples B and D (Steps 304, 305 of FIG. 13).

Returning to FIG. 11, the edge detection means 2 detects an edge of an input digital video signal $S_2$ from the memory 3 in this manner.

The edge generation means 3 of the interpolation means 601 generates the edge signal $S_E$ using the edge period of the digital video signal $S_2$ detected by the edge detection means 2 and the edge coefficient $K_2$ supplied from the interpolation control means 401. This is described with reference to FIG. 16.

Figure 17:
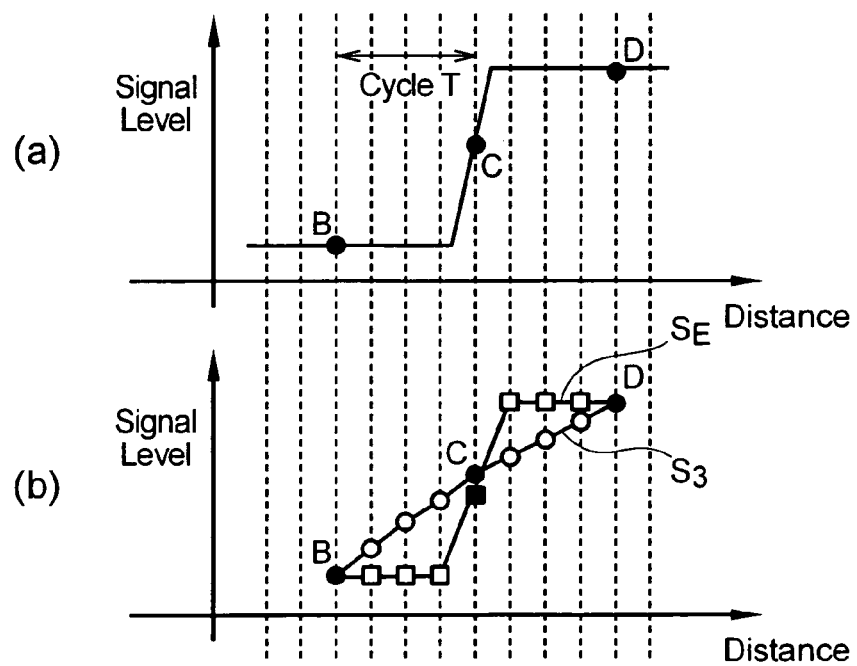
FIG. 17 is a drawing the one specific example of the operation of the edge generation means in FIG. 11.

FIG. 17(a) shows the digital video signal $S_2$ in FIG. 11 in which the edge portion of a continuous waveform was sampled in the sample cycle T. B, C, D are the samples of this digital video signal $S_2$.

Moreover, FIG. 17(b) shows the edge portion of the digital video signal $S_3$ interpolated linearly by the interpolation means 501 and the edge signal $S_E$ generated by the edge generation means 3 against this. Incidentally, black circles are the samples B, C, D, a circle is an interpolation sample interpolated linearly between the samples B and C and between the samples C and D, and a square is the sample of the edge signal $S_E$ that forms an edge period generated by the edge generation means 3.

The edge generation means 3 sequentially generates seven edge interpolation samples (shown with a square in FIG. 17) in the sample cycle t (=T/4) in the edge period detected by the edge detection means 2, for example, between the samples B and D of the digital video signal $S_2$. Supposing the j-th (where, j=1, 2, . . . , 7) signal level is $V_j$. it follows that $$V_j = B + \beta_j \times (D-B) \quad (2)$$

Where, B, D: Signal levels of samples B, D $$0 \leq \beta_j \leq 1$$

The edge generation means 3 obtains a signal level $$V_K = (B+D)/2$$

assuming $\beta_j=1/2$ in the above expression (2). Among the interpolation samples in the edge period of the digital video signal $S_3$ from the interpolation means 501, an interpolation sample of this signal level $V_K$ is generated at the timing of the interpolation sample of the signal level most approximate to this signal level $V_K$. The signal levels $V_1, V_4, \ldots, V_{K-1}$ of all edge interpolation samples that precede this edge interpolation sample are specified as signal level B when $\beta_j=0$ in the aforementioned expression (2) and the signal levels $V_{K+1}, V_{K+2}, \ldots, V_7$ of all edge interpolation samples following this edge interpolation sample are specified as signal level D when $\beta_j=1$ in the aforementioned expression (2).

Accordingly, supposing the edge interpolation sample of this signal level $V_K$ is most approximate to the signal level of the sample C of the digital video signal $S_2$, the efficient $\beta_j$ of the signal level $V_j$ in the aforementioned expression (2) of the edge interpolation sample in the edge period appears as 0, 0, 0, 1/2, 1, 1, 1

This coefficient $\beta_j$ is supplied from the interpolation control means 401 as an edge coefficient $K_2$.

Furthermore, this edge coefficient $K_2$ is not limited to only this, but it can be set optionally as occasions demand, such as 0, 0, 0, 1, 1, 1, 1

Or 0, 0, 1/3, 2/3, 1, 1, 1

Or 0, 0, 1/5, 1/2, 4/5, 1, 1

The edge signal $S_E$ generated by the edge generation means 3 in this manner is supplied to the mixing means 4. This edge signal $S_E$ and the digital video signal $S_3$ from the contour correction means 5 are mixed at a desired ratio and the digital video signal $S_4$ is generated.

Incidentally, the edge signal $S_E$ generated in this manner can reproduce an edge component exceeding one half of the sampling frequency 1/T of the digital video signal $S_2$ according to a sampling theorem, but the reproduction is a forecast to the end. Accordingly, the image quality deterioration generated by an aliasing phenomenon when the forecast was not right can be reduced by mixing the output digital video signal $S_3$ of the interpolation means 501 interpolated according to the sampling theorem and the edge signal $S_E$ output from the edge generation means 3.

The selection means 5 selects the digital video signal $S_4$ in the edge period (for example, the period between the samples B and D in FIGS. 14 to 16) of the digital video signal $S_3$ controlled using the control signal $S_S$ from the edge detection means 2 and detected by the edge detection means 2, and selects the digital video signal $S_3$ from the interpolation means 501 in other periods.

As described above, in this embodiment, when a digital picture is enlarged, because the enlarged picture is interpolated using an edge signal represented in the frequency component exceeding one half of sampling frequency in only the portion in which there is the frequency component exceeding the half of the sampling frequency of the enlarged picture, a picture having high sharpness can be obtained.

Moreover, because the edge detection means 2 and the edge generation means 3 are constructed without a multiplication means, a circuit scale can be reduced small.

Furthermore, the aforementioned embodiment was described assuming it to apply to a camera device, but the invention is not limited to only this. Needless to say, the invention can be applied to another system, such as a sample is sampled and sent as a picture in which the number of samples was reduced on the sending side and the invention applies to the sample and the picture is interpolated on the receiving side.

As described above, according to the invention, because an edge signal represented at frequency exceeding one half of the sampling frequency of a picture is generated from the digital video signal of the picture that becomes the object of a sample and the picture is interpolated using this edge signal, an edge is reproduced satisfactorily and a picture having high sharpness can be obtained.

Moreover, because an edge detection means and an edge generation means are constructed without needing a multiplication circuit, the increase of a circuit scale can be prevented and a picture having high sharpness can be obtained.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A video signal processing apparatus, comprising:
   a plurality of contour correction modules to correct a digital video signal to be input for a contour; and
   a selection module to select any of said plurality of contour correction modules, wherein:
   a predetermined contour correction module among said plurality of contour correction modules includes a contour portion detection module to detect a contour portion of said input digital video signal, and a contour portion correction module to correct a contour portion of a digital video signal corrected by one of the contour correction modules other than said predetermined contour correction module; and
   said selection module selects a digital video signal output from said contour portion correction module, when the contour portion is detected by said contour portion detection module.

2. The video signal processing apparatus according to claim 1, wherein:
   said contour correction module other than said predetermined contour correction module corrects contour by generating an undershoot and an overshoot in the contour portion of said input digital video signal.

3. The video signal processing apparatus according to claim 2, wherein:
   said contour portion correction module includes a contour correction signal generation module to generate a contour correction signal in accordance with the contour portion of said input digital video signal, and
   a mixing module to mix said contour correction signal from said contour correction signal generation module and the corrected digital video signal from the contour correction module other than said predetermined contour correction module at a predetermined ratio and to suppress the undershoot of said contour-corrected digital video signal; and
   said selection module selects an output digital signal of said mixing module, when the contour portion is detected by said contour portion detection module.

4. The video signal processing apparatus according to claim 3, wherein:
   said contour portion detection module judges whether the detected contour portion is a rising contour portion or a falling contour portion, and delays detection timing of a period of said contour portion of said input digital video signal when the detected contour portion is falling; and said contour correction signal generation module generates said contour correction signal in accordance with the contour portion period detected by said contour portion detection module.

5. The video signal processing apparatus according to claim 1, wherein said contour portion detection module comprises:

a first module to assume a flat portion to exist when a fluctuation of said digital video signal is within a range of a preset threshold, and a second module, when a slope between said two flat portions detected by said first module always ascends or descends and the absolute value of the difference of a signal level in the slope is higher than a preset threshold, to assume the contour portion of said digital video signal to exist between the two flat portions.

6. The video signal processing apparatus according to claim 1, wherein said contour portion detection module comprises:

a first module to assume a flat to exist when fluctuation of said digital video signal is within a range of a preset threshold, a second module to assume a changing point at which a slope on which the fluctuation of said digital video signal sequentially ascends or descends moves to a slope on which it descends or ascends to be a crest of a peak or a root of a valley, and a third module, when absolute value of a difference of the signal level between flat portion detected by said first module and changing point detected by said second module is higher than the preset threshold, to assume the contour portion of said digital video signal to exist between said flat portion and said changing point.

7. The video signal processing apparatus according to claim 1, wherein said contour portion detection module comprises:

a first module to assume a first changing point at which a slope on which the fluctuation of said digital video signal subsequently ascends or descends moves to a slope on which it descends or ascends to be a crest of a peak or a root of a valley and to assume a second changing point at which a slope on which it sequentially descends or ascends from said first changing point and then it ascends or descends to be the root of the valley or the crest of the peak, and a second module to assume the contour portion of said digital video signal to exist between said first and second changing points when the absolute value of a difference between said changing points detected by said first module is higher than a preset threshold.

8. A camera device, comprising:

an imaging module to photograph an object and output an electric signal;

a signal processing module to process the electric signal output from said imaging module to generate a first digital video signal; and a video signal processing apparatus according to claim 1, to correct the contour of said first digital video signal.

9. An interpolation device, comprising:

a plurality of interpolation unit that interpolates a digital video signal to be input; and a selection unit that selects any of said plurality of interpolation units, wherein:

a predetermined interpolation unit among said plurality of interpolation units includes an edge detection unit that detects an edge of said digital video signal and an edge enhancement unit that enhances the edge, and said selection unit selects an interpolation signal in which the edge is enhanced by said edge enhancement unit when the edge is detected by said edge detection unit.

10. The interpolation device according to claim 9, wherein:

said edge enhancement unit includes an edge generation unit and a mixing unit;

said mixing unit includes an operation unit that mixes an edge signal generated by said edge generation unit and an output signal of an interpolation unit other than said predetermined interpolation unit at a desired ratio; and said selection unit selects an output signal of said mixing unit when the edge is detected by said edge detection unit.

11. The interpolation device according to claim 10, wherein said edge generation unit generates an edge signal represented in frequency exceeding one half time of sampling frequency of said digital video signal.

12. The interpolation device according to 9, wherein said edge detection unit comprises:

a first unit for assuming a flat portion to exist when fluctuation of said digital video signal is within a range of a preset threshold; and a second unit for assuming the edge of said digital video signal to exist between two flat portions when a slope between said two portions detected by said first unit always ascends or descends and the absolute value of a difference of a signal level on the slope is higher than a preset threshold.

13. The interpolation device according to claim 9, wherein said edge detection unit comprises:

a first unit for assuming a flat portion to exist when fluctuation of said digital video signal is within a range of a preset threshold;

a second unit that assumes a changing point at which a slope on which the fluctuation of said digital video signal subsequently ascends or descends moves to a slope on which it descends or ascends to be a crest of a peak or a root of a valley; and a third unit for assuming the edge of said digital video signal to exist between said flat portion and said changing point when absolute value of a difference of the signal level between the flat portion detected by said first unit and the changing point detected by said second unit is higher than a preset threshold.

14. The interpolation device according to claim 9, wherein said edge detection unit comprises:

a first unit for assuming a first changing point at which a slope on which fluctuation of said digital video signal subsequently ascends or descends moves to a slope on which it descends or ascends to be a crest of a peak or root of a valley and for assuming a second changing point at which a slope on which it sequentially descends or ascends from said first changing point and then ascends or descends to be a root of a valley or a crest of a peak, and a third unit for assuming the edge of said digital video signal to exist between said first and second changing points when absolute value of a difference between said changing points detected by said first unit is higher than a preset threshold.

15. A camera device, comprising:

an imaging unit for photographing an object and outputting an electric signal;

a signal processing unit for processing the electric signal output from said imaging unit and generating a first digital video signal;

a unit for generating a second digital video signal from said first digital video signal, using a sample cycle longer than that of said first digital video signal; and an interpolation unit according to claim 9, for interpolating a sample from said second digital video signal.

16. The camera device according to claim 15, wherein:

the unit for generating a second digital video signal comprises a memory, and said memory stores said first digital video signal, reads a part of said first digital video signal, and outputs said second video signal of an enlarged picture in which a part of the picture is enlarged using said first digital video signal.

17. An imaging method for generating a second digital video signal from a signal-processed first digital video signal obtained by photographing of an imaging means, and sample interpolating the second digital video signal by a plurality of interpolation means and selecting and outputting any of a plurality of interpolated digital video signals from the interpolation means, wherein:

a sample cycle of the second digital video signal is longer than a sample cycle of said first digital video signal, and the interpolating and selecting comprises steps of:

detecting an edge in a period of said second digital video signal by a predetermined interpolation means among said plurality of interpolation means;

enhancing the edge; and selecting the interpolated digital video signal of which the edge is enhanced in the detected edge period.

* * * * *